(12) United States Patent
Kominami et al.

(10) Patent No.: US 12,151,814 B2
(45) Date of Patent: Nov. 26, 2024

(54) DISCHARGE APPARATUS FOR AERIAL VEHICLE

(71) Applicant: TOYO SEIKAN CO., LTD., Tokyo (JP)

(72) Inventors: Atsushi Kominami, Yokohama (JP); Souji Araki, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 0 days.

(21) Appl. No.: 17/629,461

(22) PCT Filed: Jul. 3, 2020

(86) PCT No.: PCT/JP2020/026299
§ 371 (c)(1),
(2) Date: Jan. 24, 2022

(87) PCT Pub. No.: WO2021/014944
PCT Pub. Date: Jan. 28, 2021

(65) Prior Publication Data
US 2022/0315224 A1     Oct. 6, 2022

(30) Foreign Application Priority Data

Jul. 23, 2019 (JP) ................................. 2019-135204
Jul. 23, 2019 (JP) ................................. 2019-135205
Jul. 23, 2019 (JP) ................................. 2019-135206

(51) Int. Cl.
*B64D 1/18*     (2006.01)
*B64D 47/08*    (2006.01)
(Continued)

(52) U.S. Cl.
CPC .............. *B64D 1/18* (2013.01); *B64U 10/14* (2023.01); *B64U 50/19* (2023.01); *B64D 47/08* (2013.01);
(Continued)

(58) Field of Classification Search
CPC .. B64D 1/18; B64U 2101/40; B64U 2101/47; B64U 2101/45; B64U 2101/28; B64U 2101/29; B05B 13/005; B05B 12/122
See application file for complete search history.

(56) References Cited

U.S. PATENT DOCUMENTS

2016/0082460 A1*  3/2016  McMaster .............. B64U 10/14
                                                                      239/722
2017/0203318 A1   7/2017  Vahanen et al.
(Continued)

FOREIGN PATENT DOCUMENTS

CN     204507277 U     7/2015
CN     106623172 A     5/2017
(Continued)

OTHER PUBLICATIONS

Office Action in CN Application No. 202080053071.1 dated Jun. 8, 2023, 27 pages.
(Continued)

*Primary Examiner* — Philip J Bonzell
*Assistant Examiner* — Eric Acosta
(74) *Attorney, Agent, or Firm* — MARSHALL, GERSTEIN & BORUN LLP

(57) ABSTRACT

A discharge apparatus for an aerial vehicle is provided which is capable of mounting an aerosol container by effectively utilizing a space outside an airframe.

The discharge apparatus for an aerial vehicle, in which a content is discharged through a nozzle from an aerosol container mounted on an airframe, is characterized in that the aerosol container is mounted outside the airframe, and is arranged so that a central axis of the aerosol container is along a pitch axis of the airframe, or arranged on an extension portion such as a small wing extending from a fuselage of the airframe, an arm portion provided with a rotor blade, a leg portion for taking off and landing, or the
(Continued)

like, with the aerosol container and the nozzle being connected to each other through a tube.

3 Claims, 38 Drawing Sheets

(51) Int. Cl.
    *B64U 10/14*         (2023.01)
    *B64U 50/19*         (2023.01)
    *B64U 101/30*       (2023.01)
    *B64U 101/45*       (2023.01)

(52) U.S. Cl.
    CPC ...... *B64U 2101/30* (2023.01); *B64U 2101/45* (2023.01)

(56) References Cited

U.S. PATENT DOCUMENTS

| | | | |
|---|---|---|---|
| 2019/0202558 A1* | 7/2019 | Teetzel | .................... G01S 19/42 |
| 2019/0247877 A1* | 8/2019 | Fideler | .................... B64C 15/00 |
| 2021/0061543 A1 | 3/2021 | Murakami | |

FOREIGN PATENT DOCUMENTS

| | | | | |
|---|---|---|---|---|
| CN | 109258601 A | | 1/2019 | |
| JP | 2007252274 A | * | 10/2007 | |
| JP | 2017-104063 A | | 6/2017 | |
| JP | 2018-191610 A | | 12/2018 | |
| KR | 101956345 B1 | | 3/2019 | |
| WO | WO-9315955 A1 | * | 8/1993 | ............... B64D 1/18 |
| WO | WO-2019/138576 A1 | | 7/2019 | |

OTHER PUBLICATIONS

Office Action in JP Application No. 2019-135204 dated Mar. 3, 2020, 9 pages.
Office Action in JP Application No. 2019-135205 dated Mar. 3, 2020, 8 pages.
Office Action in JP Application No. 2019-135206 dated Mar. 3, 2020, 11 pages.
Search Report in International Application No. PCT/JP2020/026299 dated Aug. 18, 2020, 4 pages.

* cited by examiner

FIG.5(A)
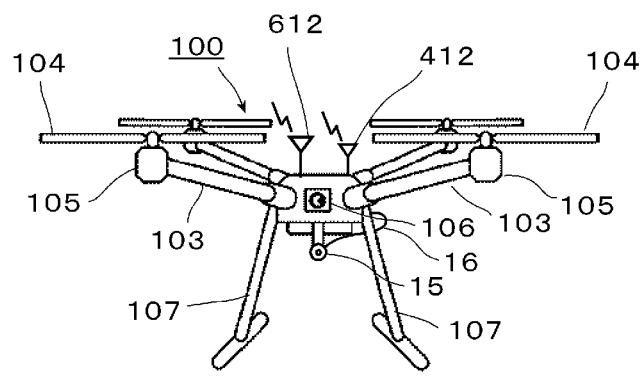
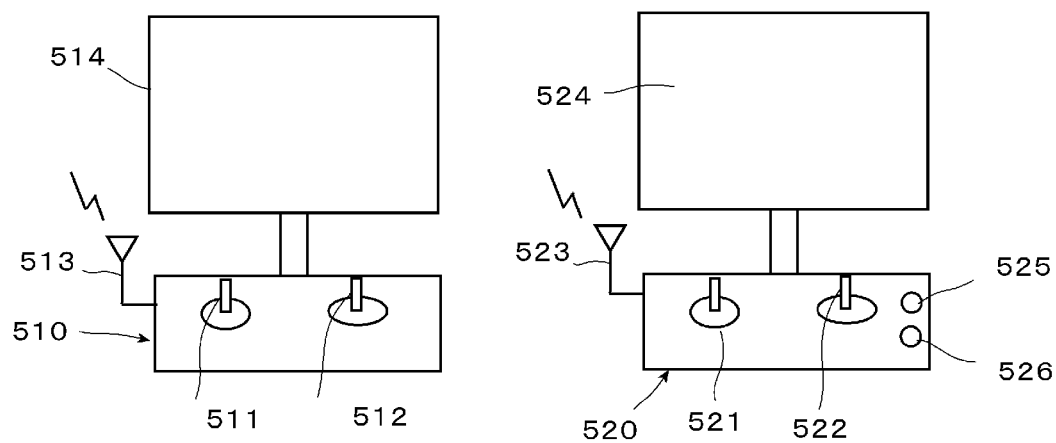
FIG.5(B)
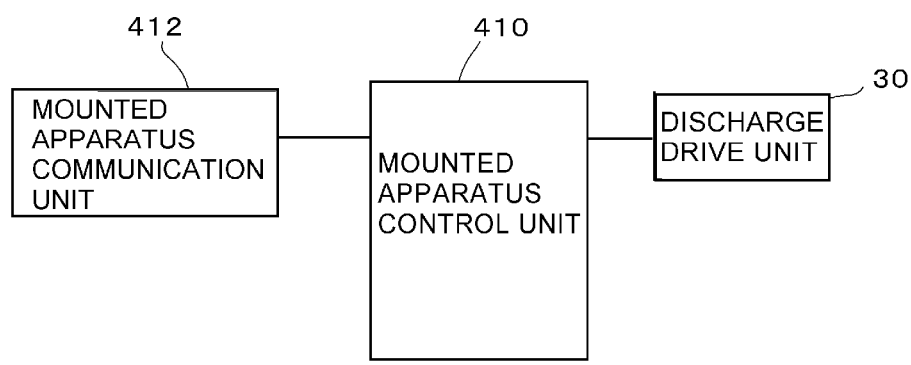

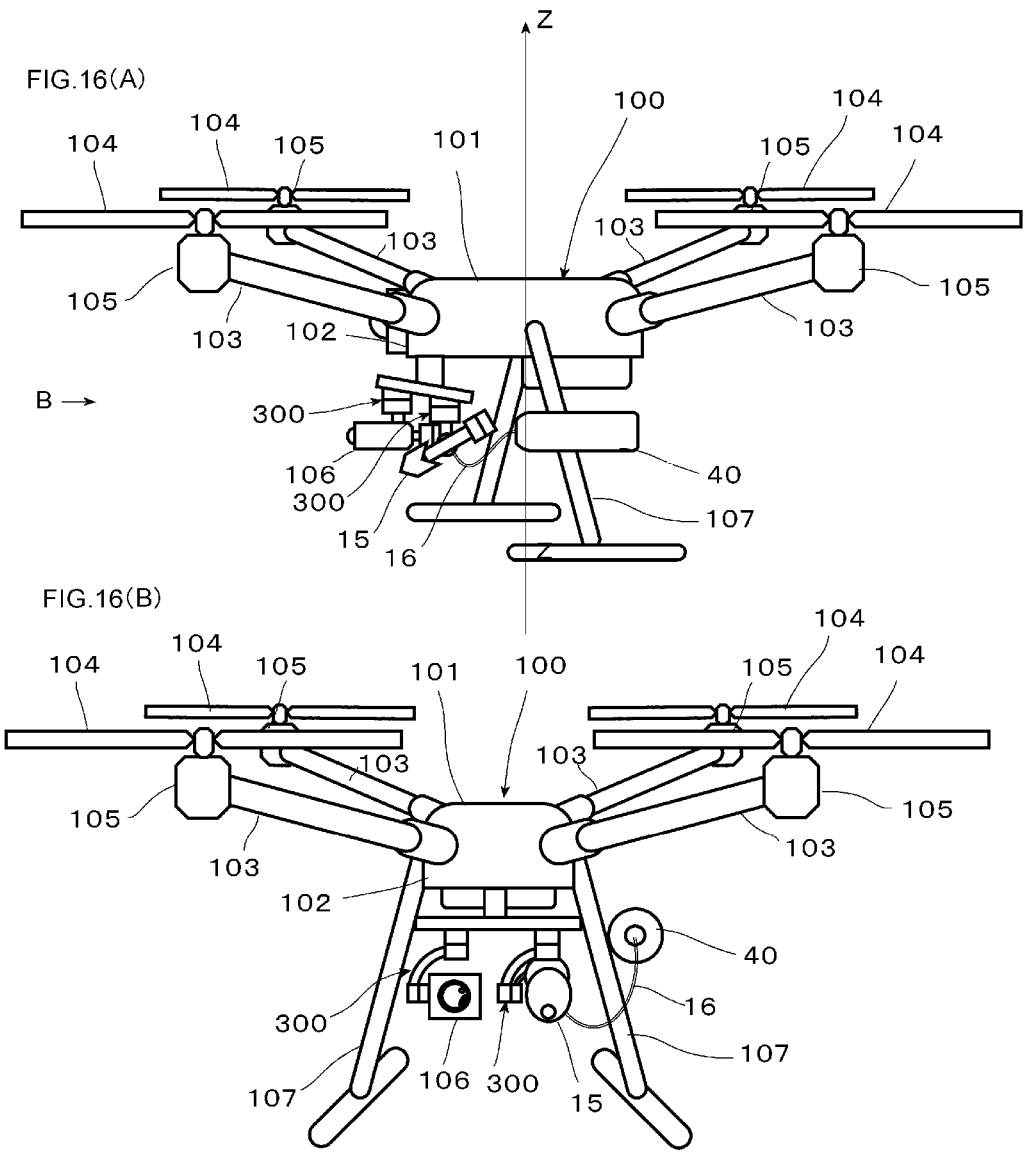

FIG.19(A)
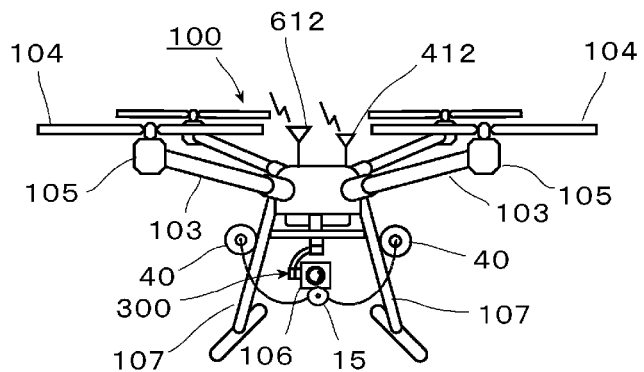
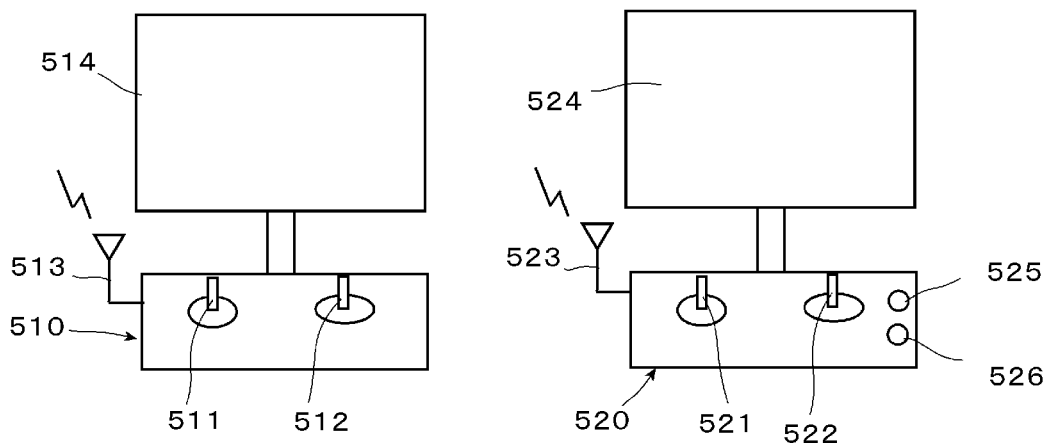
FIG.19(B)

DISCHARGE APPARATUS FOR AERIAL VEHICLE

TECHNICAL FIELD

The present invention relates to a discharge apparatus for a moving vehicle such as an unmanned aerial vehicle, which is configured to discharge liquid, gas, air, sound (horn), or the like from the moving vehicle, and more particularly to a discharge apparatus for an aerial vehicle including an aerosol container that discharges its content by gas pressure.

BACKGROUND ART

Conventionally, as a discharge apparatus for an aerial vehicle or aircraft using this type of aerosol container, there has been known, for example, a device for exterminating bees as described in Patent Literature 1. This bee exterminating device has a chemical supply unit inside an airframe of the aerial vehicle, which supplies a chemical to a beehive, and an aerosol container acting as an injection tool is attached to the chemical supply unit.

Then, when exterminating bees, the unmanned aerial vehicle is made to fly to the vicinity of the beehive and to hover thereover while visually recognizing images of a camera mounted on the airframe, and a movement button located on a controller is operated so that an injection hole of the chemical supply unit (nozzle) is directed to face the beehive, thereby to spray the chemical.

CITATION LIST

Patent Literature

Patent Literature 1: Japanese Patent Application Laid-Open Publication No. 2017-104063

SUMMARY OF INVENTION

Technical Problem

First Problem

However, since the device of Patent Literature 1 has a configuration in which the aerosol container is mounted inside the airframe, it is necessary to significantly modify the airframe in accordance with the aerosol container. The aerosol container varies in size, such as diameter, height, etc., and if the size does not match, further modifications are required. In addition, the shape and size of the airframe are also restricted so as to mount the aerosol container.

Therefore, it is conceivable to mount the aerosol container on the outside of the airframe of the aerial vehicle, but when the fuselage of the airframe is small, it is difficult to secure space. In particular, in cases where a camera is mounted, it is necessary to avoid the space for the camera.

Second Problem

In addition, the device in Patent Literature 1 is equipped with only one aerosol container, which needs to be replaced frequently if it needs to be used in a large quantity. When the aerosol container is emptied in the middle of work, the work will have to be stopped and the aerial vehicle will have to return, which reduces the efficiency of the work. Therefore, it is conceivable to mount a plurality of aerosol containers, but there is no space for mounting a plurality of aerosol containers in the airframe.

Third Problem

Further, in the device of Patent Literature 1, the chemical supply unit (nozzle) is moved so as to direct its injection hole toward the beehive while checking the images taken by the camera, but in cases where a direction changing device for the camera and another direction changing device for the nozzle are respectively provided, the spaces corresponding to these direction changing devices would be required, and not only the entire weight of the device would be increased, but also a control method and an operation method for controlling the respective directions would become complicated.

A first object of the present invention is to provide a discharge apparatus for an aerial vehicle capable of mounting an aerosol container by effectively utilizing a space outside an airframe.

A second object of the present invention is to provide a discharge apparatus for an aerial vehicle capable of mounting a plurality of aerosol containers by effectively utilizing a space outside an airframe, thereby making it possible to increase work efficiency.

A third object of the present invention is to provide a camera-equipped discharge apparatus capable of simplifying a control method while making it possible to change a direction of the camera and a direction of a nozzle by effectively utilizing a space outside an airframe.

A common object is to effectively utilize a space outside an airframe.

Solution to Problem (First Solution)

A first solution for achieving the above-mentioned first object is constituted by the following group of inventions.

A first invention is directed to a discharge apparatus for an aerial vehicle in which a content is discharged through a nozzle from an aerosol container mounted on an airframe, and which is characterized in that: the aerosol container is mounted outside the airframe; a central axis of the aerosol container is arranged along a pitch axis of the airframe; and the aerosol container and the nozzle are connected to each other through a tube.

In this way, the aerosol container can be mounted on the outside of the airframe without any modification to the inside of the airframe. In addition, by connecting the nozzle to the aerosol container through the tube, the nozzle can be arranged at an optimum position regardless of a mounting space for the aerosol container. Moreover, by orienting a central axis of the elongated aerosol container in the direction of the pitch axis, it is possible to secure a space for arranging a camera or the like in the direction of a roll axis thereby to utilize the space in an effective manner. Further, by arranging the central axis of the aerosol container in the direction of the pitch axis (lateral direction), it is possible to achieve a weight balance.

In addition, a second invention is directed to a discharge apparatus for an aerial vehicle in which a content is discharged through a nozzle from an aerosol container mounted on an airframe, and which is characterized in that: the aerosol container is arranged in an extension portion extending from a fuselage of the airframe; and the aerosol container and the nozzle are connected to each other through a tube.

By mounting the aerosol container on the extension portion extending from the fuselage of the airframe in this manner, it is possible to effectively utilize the space of the airframe. In addition, by connecting the nozzle to the aerosol container through the tube, the nozzle can be arranged at an optimum position regardless of a mounting space for the aerosol container.

The discharge apparatus for an aerial vehicle according to the second invention can be configured as follows.

1. The extension portion in the second invention is a small wing provided on the airframe, or an arm portion on which a rotor is provided, or a leg portion for taking off and landing.

Also, the discharge apparatus for an aerial vehicle according to the first or second invention can be configured as follows.

1. A plurality of aerosol containers are provided, and tubes connected to the plurality of aerosol containers merge to be connected to one nozzle.

In this way, only the one nozzle is required.

2. A camera is mounted on the airframe, and the nozzle and the camera are configured such that they are supported so as to be movable with respect to the airframe, and they are moved with respect to a target object, while synchronizing a discharge direction of the nozzle and an imaging direction of the camera with each other.

According to such a configuration, it is possible to always visually recognize the discharge direction of the nozzle by means of the camera.

3. The nozzle is positioned adjacent to the camera.

4. The nozzle is attached to the camera.

With this configuration, the nozzle can be moved in synchronization with the camera in a reliable manner.

5. The nozzle is supported by a direction changing device that has a degree of freedom of rotation that makes an attitude of the camera variable.

Thus, the nozzle can be moved in synchronization with the camera without the nozzle itself being provided with a direction changing device.

6. The nozzle is supported by a direction changing device that is different from the direction changing device having the degree of freedom of rotation that makes the attitude of the camera variable.

With the provision of the direction changing device for the nozzle itself, it is possible to adjust the attitude of the nozzle.

7. The camera is supported by a direction changing device having a degree of freedom of rotation that makes the attitude of the nozzle variable.

Thus, it is possible to move the camera in synchronization with the nozzle without providing a direction changing device for the camera itself.

(Second Solution)

A second solution to achieve the above-mentioned second object is constituted by the following group of inventions.

A first invention is directed to a discharge apparatus for an aerial vehicle in which a content is discharged through a nozzle from each aerosol container mounted on an airframe, and which is characterized in that: the aerosol container is mounted in plurality; and tubes are connected to the aerosol containers, respectively, and are connected to the one nozzle.

Thus, a plurality of aerosol containers can be mounted, so that even when one aerosol container becomes empty, a content can be discharged from another aerosol container without interrupting work, as a result of which work efficiency is increased, and the complicated management of the aerosol containers is reduced. In addition, by collectively connecting a plurality of tubes to one nozzle, only one nozzle is required, and a discharge direction thereof can be made constant.

This first invention can also be configured as follows.

1. A camera is mounted on the airframe, and the nozzle is adjacent to the camera.

The phrase "adjacent to the camera" is defined as an area which includes a position in contact with the camera and a vicinity area of the camera away from the camera, and in which a discharge target position (discharge direction) is at least within the field of view of the camera without changing the attitudes of the nozzle and the camera.

In this way, regardless of the direction of each aerosol container, the discharge direction can be aligned with the imaging direction of the camera.

In addition, a second invention, which constitutes the second solution, is directed to a discharge apparatus for an aerial vehicle in which a content is discharged through each nozzle from each aerosol container mounted on an airframe, and which is characterized in that the aerosol container is mounted in plurality; and nozzles connected to tubes, which are connected to the aerosol containers, respectively, are collectively arranged adjacent to a camera mounted on the airframe.

According to the second invention, too, a plurality of aerosol containers can be mounted, and even when one aerosol container becomes empty, a content can be discharged from another aerosol container without interrupting work, so that work efficiency is increased and the complicated management of the aerosol containers is reduced.

Even with such a configuration, regardless of the direction of each aerosol container, the discharge direction can be aligned with the imaging direction of the camera.

The first and second inventions, which constitute the above-mentioned second solution, can be configured as follows.

1. The aerosol containers are characterized in that they are arranged in extension portions, respectively, that extend from a main body portion of the airframe.

By mounting the aerosol containers on the extension portions extending from a fuselage of the airframe in this manner, it is possible to effectively utilize the space of the airframe.

2. The extension portions are small wings provided on the airframe, or arm portions on which rotors are mounted, or leg portions for taking off and landing.

3. Each nozzle and the camera are configured such that they are supported so as to be movable with respect to the airframe, and they are moved with respect to a target object while synchronizing a discharge direction of each nozzle and an imaging direction of the camera with each other.

4. Each nozzle is attached to the camera.

With such a configuration, each nozzle can be moved in synchronization with the camera in a reliable manner.

5. Each nozzle is supported by a direction changing device having a degree of freedom of rotation that makes an attitude of the camera variable.

Thus, each nozzle can be moved in synchronization with the camera without the nozzle itself being provided with a direction changing device.

6. Each nozzle is supported by a direction changing device that is different from the direction changing device having a degree of freedom of rotation that makes an attitude of the camera variable.

With the provision of the direction changing device for each nozzle itself, it is possible to adjust an attitude of each nozzle.

7. The camera is supported by a direction changing device having a degree of freedom of rotation that makes an attitude of each nozzle variable.

Thus, it is possible to move the camera in synchronization with each nozzle without providing a direction changing device for the camera itself.

(Third Solution)

A third solution for achieving the above-mentioned third object is constituted by the following inventions.

That is, a camera-equipped discharge apparatus of the present invention, which comprises:

a nozzle configured to discharge a content of an aerosol container mounted on a moving vehicle; and a camera mounted on the moving vehicle;

is characterized in that the nozzle and the camera are arranged so as to be operated in unison by a common direction changing device.

According to the present invention, since a configuration is adopted in which the nozzle and the camera are operated in unison by the common direction changing device, there is no need to separately provide a direction changing device for the nozzle and a direction changing device for the camera. With this, it is possible to achieve weight reduction while making it possible to change the direction of the camera and the direction of the nozzle. In addition, it is possible to simplify a control method for changing the direction of the camera and the direction of the nozzle.

1. A holding member for holding the nozzle and the camera may be provided, and the nozzle may be attached to a distal end of a connection tube connected to the aerosol container fixed to the moving vehicle.

2. It is also preferable that a frame body for holding the aerosol container be provided, and that the nozzle and the camera be held by the frame body.

3. The camera may be arranged at a position capable of imaging a discharge state of the content to be discharged from the nozzle.

4. The direction changing device may include at least one rotating body that rotatably supports the nozzle such that a direction of the nozzle can be changed, and an extension line of a center line of a discharge port in the nozzle may intersect with extension lines of rotation center lines of all the rotating bodies. Here, note that "an extension line of a center line of a discharge port in the nozzle intersects with extension lines of rotation center lines of all the rotating bodies" means that it is configured to intersect with them in terms of design. Therefore, in an actual product, dimensional tolerances or the like will occur, and hence, even in a case where the product is slightly deviated, it is still included in the present invention.

According to the above configuration, it is possible to suppress a reaction force generated upon discharge of the content from the nozzle from acting as a torque to rotate each rotating body.

5. The direction changing device may include a first motor, a first rotating body that is rotated by a driving force of the first motor, a second motor that is turned in accordance with the rotation of the first rotating body, a second rotating body that is rotated by a driving force of the second motor, a third motor that is turned in accordance with the rotation of the second rotating body, and a third rotating body that is rotated by a driving force of the third motor, wherein the nozzle is arranged so as to change its direction in accordance with an operation of the third rotating body.

6. The direction changing device also preferably includes a first motor, a first rotating body that is rotated by a driving force of the first motor, a second motor that is turned in accordance with the rotation of the first rotating body, and a second rotating body that is rotated by a driving force of the second motor, wherein the nozzle is arranged so as to change its direction in accordance with an operation of the second rotating body.

Here, note that the above-described configurations can be employed in any combination whenever possible.

Advantageous Effects of Invention

According to the first solution, an aerosol container can be mounted by effectively utilizing a space outside an airframe.

According to the second solution, it becomes possible to mount a plurality of aerosol containers, so that work efficiency can be enhanced, while effectively utilizing a space outside an airframe.

According to the third solution, space can be effectively used, so that weight reduction can be achieved and a control method can be simplified, while making it possible to change the direction of a camera and the direction of a nozzle.

BRIEF DESCRIPTION OF DRAWINGS

FIG. 5 (A) is an explanatory view illustrating an example of remote operation of a first operation terminal and a second operation terminal for the aerial vehicle with the discharge apparatus mounted thereon, and FIG. 5 (B) is a control block diagram thereof.

FIG. 16 (A) is an overall configuration view illustrating, as a perspective view, an aerial vehicle in a discharge apparatus for an aerial vehicle according to a seventh embodiment of the invention of the first solution, and FIG. 16 (B) is a view of FIG. 16 (A) seen from the direction of an arrow B.

FIG. 19 (A) is an explanatory view illustrating an example of remote operation of a first operation terminal and a second operation terminal for an aerial vehicle with a discharge apparatus mounted thereon, and FIG. 19 ((B) is a control block diagram thereof.

DESCRIPTION OF EMBODIMENTS

Figure 1A:
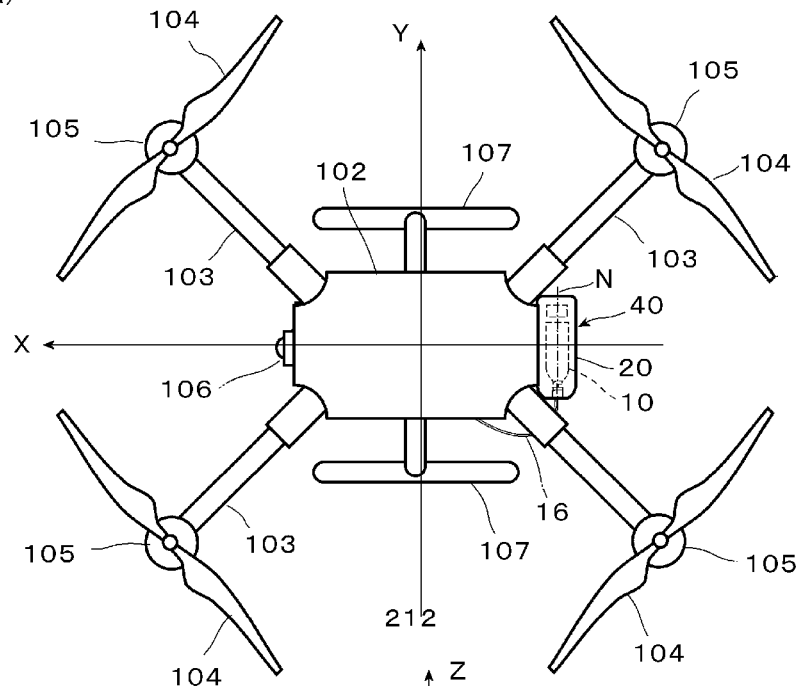
FIG. 1 conceptually illustrates a discharge apparatus for an aerial vehicle according to a first embodiment of an invention of a first solution, wherein FIG. 1 (A) is a plan view, and FIG. 1 (B) is an overall configuration view illustrating the aerial vehicle as a perspective view.

Hereinafter, the present invention will be described in detail on the basis of embodiments illustrated in the drawings.

The dimensions, materials, shapes, relative arrangements, etc., of the components described in the following embodiments should be changed as appropriate depending on the configuration and various conditions of an apparatus to which the invention is applied, and are not intended to limit the scope of the invention to the following embodiments.

In the following description, an invention of a first solution, inventions of a second solution, and an invention of a third solution are described in this order, and when there are a plurality of embodiments of each invention, the embodiments are numbered consecutively, starting from 1 as the embodiments of the invention of each solution. In addition, in each embodiment, the same components are denoted by the same reference signs.

Invention of First Solution

First Embodiment

Figure 1B:
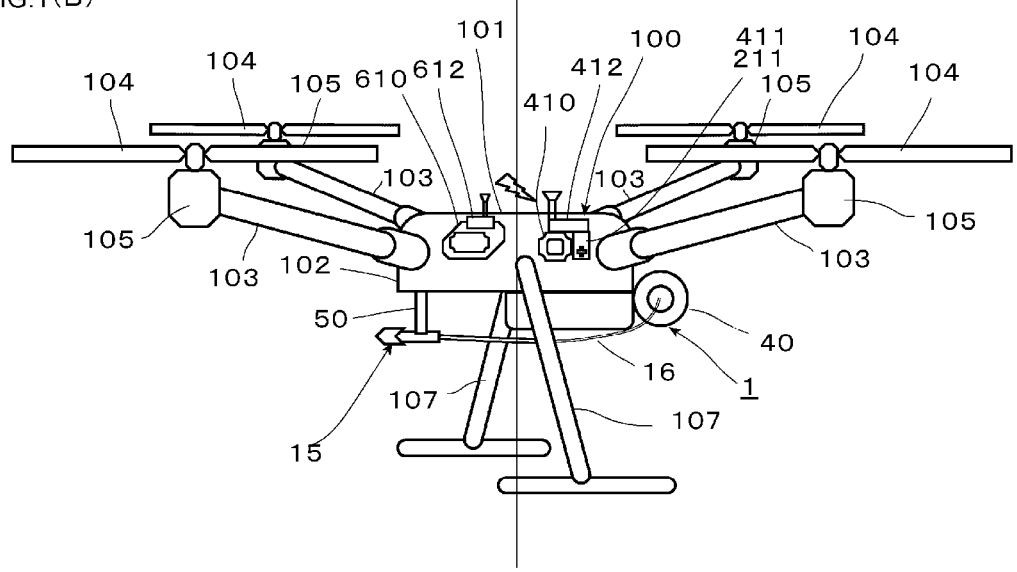
Figure 2A:
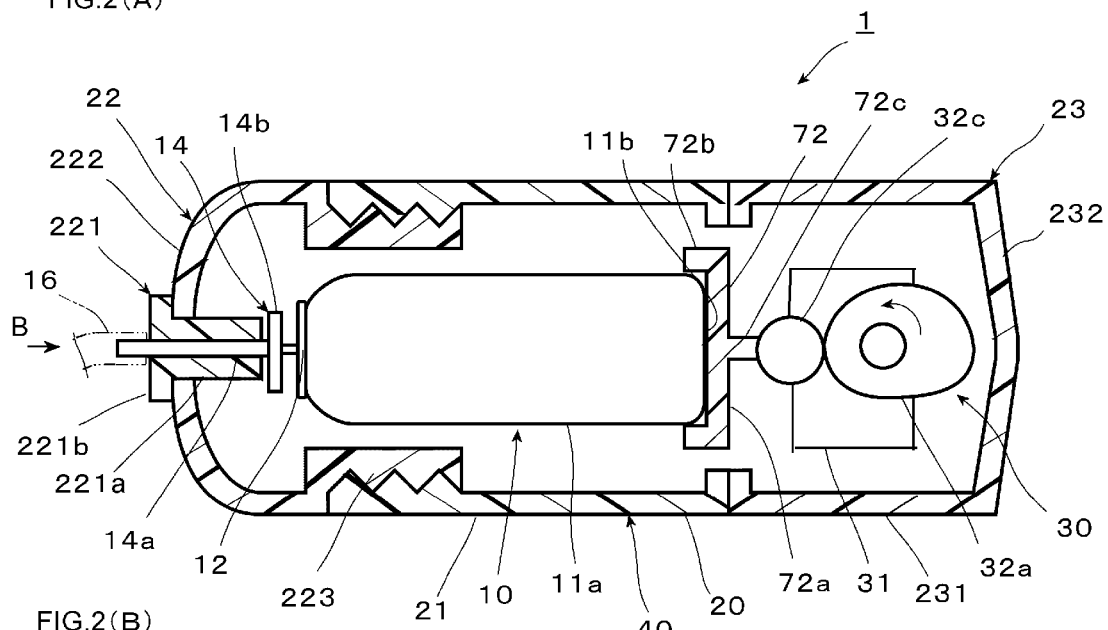
FIG. 2 (A) is a cross-sectional view of an aerosol container assembly of FIG. 1, FIG. 2 (B) is a view illustrating a tube and a nozzle, FIG. 2 (C) is a cross-sectional view illustrating a specific example of the nozzle, and FIG. 2 (D) is a view seen from the direction of an arrow B in FIG. 2 (A).
Figure 2B:
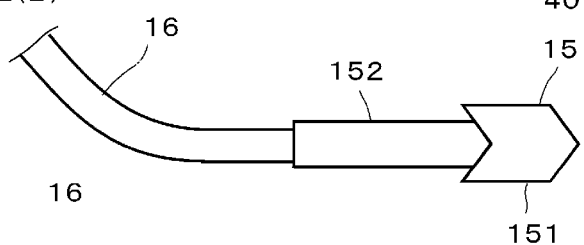
Figure 2C:
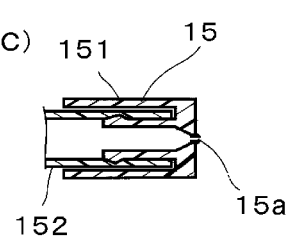
Figure 2D:
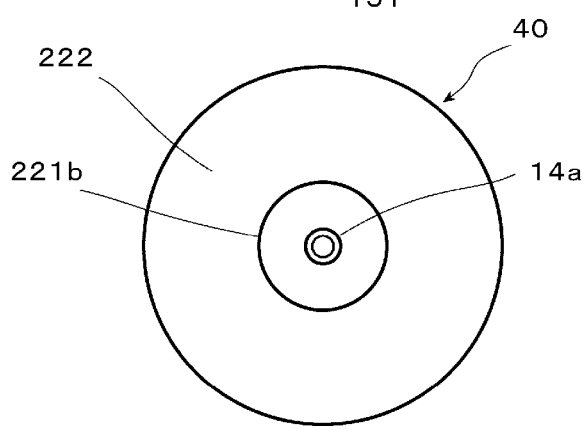

First, an overall configuration will be described with reference to FIG. 1. FIG. 1 conceptually illustrates a discharge apparatus for an aerial vehicle according to a first embodiment of the invention of the first solution, wherein FIG. 1(A) is a plan view of the entire aerial vehicle with the discharge apparatus mounted thereon, and FIG. 1(B) is an overall configuration view illustrating the aerial vehicle as a perspective view.

In FIG. 1, 100 denotes the aerial vehicle. The aerial vehicle 100 is an unmanned aircraft such as a so-called multicopter, and an airframe 101 includes an airframe fuselage 102, four arms 103 radially extending from the airframe fuselage 102, and legs 107 for taking off and landing, wherein four rotor blades or rotary wings 104 are provided at the tips of the arms 103 through motors 105, respectively. In the illustrated example, a quadcopter having four rotor blades 104 is illustrated, but various known multicopters such as those having three rotor blades (tricopter), six rotor blades (hexacopter) or the like are applicable.

In the figure, a yaw axis, a roll axis, and a pitch axis of the airframe 101 are denoted by Z, X, and Y, respectively; a left direction and a right direction on the drawing sheet are defined as a front side and a rear side, respectively; an upper direction and a lower direction on the drawing sheet along the yaw axis Z in FIG. 1 (B) are defined as an upper side and a lower side, respectively; and an upper direction and a lower direction on the drawing sheet along the pitch axis Y in FIG. 1 (A) are defined as a right side and a left side, respectively.

An aerosol container assembly 40, in which an aerosol container 10 is incorporated into a sleeve 20, is mounted on the outside of the airframe 101 of the aerial vehicle 100, i.e., in the illustrated example, on a rear surface of the airframe fuselage 102. A nozzle 15 is attached to the airframe 101 at a location different from that of the aerosol container assembly 40, and the aerosol container 10 is connected to the nozzle 15 through a tube 16, so that its content is discharged from the nozzle 15. An aerosol container assembly 40 with the aerosol container 10, the tube 16, and the nozzle 15 are included in a discharge apparatus 1 for an aerial vehicle according to the present embodiment.

In this embodiment, the aerosol container assembly 40 is mounted on a rear end surface of the airframe fuselage 102, and the nozzle 15 is attached to a front end portion of a lower surface of the airframe fuselage 102 that is suitable for discharge. The nozzle 15 is held at a position downward away from the airframe fuselage 102 through a nozzle support portion 50, and is oriented so that the discharge direction thereof is parallel to the roll axis X. In cases where the nozzle 15 is movable, the discharge direction changes, but an origin position is set to be parallel to the roll axis. Further, in the illustrated example, a camera 106 is mounted on a front surface of the airframe fuselage 102.

The aerosol container assembly 40 is mounted such that a central axis N of the aerosol container 10 is parallel to the pitch axis Y.

The tube 16 is a deformable flexible tube, and a connection portion thereof with the aerosol container 10 is directed in parallel with the pitch axis Y, and a connection portion thereof with the nozzle 15 is directed in parallel with the roll axis X, but the tube 16 is deformed according to a connection direction, thus allowing a connection to be made at any position.

The tube 16 does not necessarily have to be flexible over its entire length, but only has to be partially deformable in a portion where the direction changes. In addition, if the arrangement positions of the aerosol container assembly 40 and the nozzle 15 are determined and the nozzle 15 is not movable but fixed, a non-deformable tube may be arranged in a predetermined layout.

In this way, by mounting the aerosol container 10 on the outside of the airframe 101, the aerosol container 10 can be mounted without modifying the inside of the airframe. Moreover, if the nozzle 15 is connected through the tube 16, the nozzle 15 can be arranged at an optimal position for discharge, regardless of the mounting position of the aerosol container 10. Further, by orienting the central axis N of the elongated aerosol container 10 in a direction parallel to the pitch axis Y, it is possible to secure a space for arranging a gimbal of the camera or the like in the direction of the roll axis X of the airframe fuselage 102, thereby achieving effective use of the space. Furthermore, by arranging the elongated aerosol container in the pitch axis direction (lateral direction), it is possible to balance the right and left weight.

Here, note that in the illustrated example, the aerosol container assembly 40 is mounted on the rear surface of the airframe fuselage 102, but it may be mounted on the lower surface, the upper surface, or the front surface of the airframe fuselage 102.

Next, the configuration of the discharge apparatus of FIG. 1 will be described in more detail with reference to FIG. 2. In FIG. 2, (A) is a cross-sectional view of the aerosol container assembly of FIG. 1, FIG. 2 (B) is a view illustrating the tube and the nozzle, FIG. 2 (C) is a cross-sectional view illustrating a specific example of the nozzle, and FIG. 2 (D) is a view seen from the direction of an arrow D in FIG. 2 (A).

As described above, the aerosol container 10 is mounted on the airframe 101 as the aerosol container assembly 40, wherein the content of the aerosol container 10 is discharged from above the airframe 101. The content to be discharged includes not only liquid but also gas such as gaseous matter, air or the like, powder or the like, and further includes sound (horn) and the like. The discharge of sound is configured, for example, such that sound is generated when gas is discharged.

The aerosol container 10 is mounted on the airframe 101 in a state of being housed in a sleeve (housing member) 20. A discharge drive unit 30 for discharging the content from the aerosol container 10 is built in the sleeve 20. The sleeve 20 and the aerosol container 10 are replaceable as a unit.

Hereinafter, the configuration of each part or unit will be described.

[Aerosol Container]

The aerosol container 10 is a container that discharges its content by gas pressure of liquefied gas or compressed gas filled therein, and an existing aerosol container made of metal can be applied, or a container made of plastic having pressure resistance can be used. In the aerosol container 10, various actuators in which a flow passage is formed according to a discharge direction or a discharge form can be mounted on a stem 12. In the illustrated example, an example is shown in which the actuator 14 having the flange portion 14b is attached to the stem 12 of the aerosol container 10. The actuator 14 is configured to include a linear main body portion 14a having a straight discharge flow passage, and a flange portion 14b protruding from the main body portion 14a in a direction perpendicular to the axis thereof. As illustrated in FIG. 2 (B), the nozzle 15 is connected to the main body portion 14a of the actuator 14 through a flexible tube 16. The nozzle 15 has a nozzle main body 151 and a joint portion 152 for connecting the nozzle main body 151 to the tube 16.

FIG. 2 (C) illustrates a specific configuration of the nozzle main body 151 and the joint portion 152, in which the nozzle main body 151 is provided with an injection port 15a having a narrowed flow passage, and is connected and fixed to the joint portion 152. The injection port 15a is appropriately selected depending on whether the content is to be discharged in a mist form or as a linear jet flow, or depending on the discharge form and the discharge direction of the content.

In the first embodiment, since the aerosol container 10 is used by being mounted on the rear surface of the airframe fuselage 102 in the direction parallel to the pitch axis Y, the form of a propellant and the content to be sealed is an isolated type in which a stock solution is contained in an inner bag and the propellant is contained between the outer periphery of the inner bag and the inner periphery of a container main body. In the case of the isolated type, discharge can be made from the aerosol container even when the aerosol container is in a horizontal direction (the stem is positioned horizontally) or a downward direction (the stem is positioned downward).

However, in cases where the aerosol container 10 is not mounted in a horizontal state as in the first embodiment, the present invention is not limited to the isolated type, but in cases where the attitude of the aerosol container 10 at the time of discharge is used with the stem 12 facing upward, a two-phase type or three-phase type container with a dip tube can be applied, and in cases where the attitude of the aerosol container 11 is used with the stem 12 facing downward, a two-phase type or three-phase type container having no dip tube can be applied.

Here, note that liquefied gases such as general hydrocarbons (liquefied petroleum gas) (LPG), dimethyl ether (DME), fluorinated hydrocarbons (HFO-1234ZE), etc., as well as compressed gases such as carbon dioxide ($CO_2$), nitrogen ($N_2$), nitrous oxide ($N_2O$), etc., can be used as propellants, but non-flammable fluorinated hydrocarbons, carbon dioxide, nitrogen, nitrous oxide, etc., are suitable, and nitrogen is particularly suitable, in consideration of environmental load.

[Configuration of Sleeve 20]

The sleeve 20 is made of a strong, lightweight material such as aluminum or other metals, plastic, carbon fiber, etc. In addition, not only a hard material but also a soft material, for example, a rubber material such as silicone rubber or urethane foam can be used. In short, various materials capable of retaining the shape of the housing portion that houses the aerosol container 10 can be used. The term "sleeve" is used to mean a tubular member in which the cylindrical aerosol container 10 is housed.

The sleeve 20 is composed of a cylindrical sleeve main body 21 with a larger diameter than the aerosol container 10, a first end cover portion 22 covering one end of the sleeve main body 21, and a second end cover portion 23 provided at the other end of the sleeve main body 21.

The first end cover portion 22 is configured to be detachably screwed and fixed to the sleeve main body 21 through a threaded portion, and the second end cover portion 23 is undetachably fixed to the sleeve main body 21. The second end cover portion 23 and the sleeve main body 21 may be integral with each other.

The first end cover portion 22 is configured to include a dome-shaped cover main body 222, and a screw cylinder portion 223 that is screwed into a female threaded portion of the sleeve main body 21. The cover main body 222 has a conical shape with a rounded tip or a dome-shaped curved surface whose diameter is gradually reduced toward its tip in consideration of aerodynamic characteristics. With such a shape having good aerodynamic characteristics, the influence of horizontal wind (crosswind) is reduced, and flight can be stabilized.

The second end cover portion 23, which is located at the bottom side of the aerosol container 10, is configured to include a tubular portion 231 having one end fixed to the rear end portion of the sleeve main body 21 (the bottom side end portion of the aerosol container 10), and an end plate 232 closing the other end of the tubular portion 231. The discharge drive unit 30 is housed in the second end cover portion 23.

[Support Structure of Aerosol Container 10]

The inner diameter of the sleeve 20 is larger than the outer diameter of a body portion 11a of the aerosol container 10, and the aerosol container 10 is supported at a certain distance away from the wall of the sleeve 20. The body portion 11a of the aerosol container 10 can be supported without separating it from the inner wall of the sleeve 20, but by separating the body portion 11a of the aerosol container 10 from the inner wall of the sleeve 20, a heat insulation material and/or a heat storage material can be interposed in a separation space.

It should be noted that the sleeve 20 may not have a sealed structure, but may have a structure in which a part thereof is ventilated. For example, a structure such as a mesh structure, a punched structure or the like can be applied. In this way, the self-cooling at the time of aerosol discharge can be mitigated by outside air, and the weight of the sleeve 20 can be reduced.

On the other hand, a bottom portion 11b of the aerosol container 10 is supported by a container holding portion 72, and a head portion side of the aerosol container 10 is supported by a pressing member 221 provided on the first end cover portion 22.

The pressing member 221 includes a tubular body 221a protruding from the top of the first end cover portion 22 toward the stem 12 in the central axis direction of the aerosol container 10, and an end flange portion 221b provided at one end of the tubular body 221a and fixed to the first end cover portion 22. The tube 16 connecting the actuator 14 and the nozzle 15 to each other is inserted into the inner periphery of the tubular body 221a of the pressing member 221 so as to be slidable in the axial direction, and the distal end surface of the tubular body 221a is in abutment with or close to the flange portion 14b of the actuator 14. The pressing member 221 may be formed integrally with the second end cover portion 23.

Next, the discharge drive unit 30 will be described.

The discharge drive unit 30 includes a motor 31 serving as a rotary drive source, and a cam mechanism 32 configured to convert the rotational motion of the motor 31 into linear motion of the container holding unit 72. The motor 31 and the cam mechanism 32 are assembled to an unillustrated frame fixed to the second end cover portion 23. The cam mechanism 32 includes a cam 32a that is rotationally driven by the motor 31, and a cam follower 32c that is provided on the container holding portion 72 so as to move along a cam surface of the cam 32a. The cam 32a in the illustrated example is an oval disc cam, and a camshaft of the cam 32a is orthogonal to the central axis of the aerosol container 10, so that the rotation of the cam 32a is converted into linear motion of the container holding portion 72 via the cam follower 32c. Since the cam 32a is the disc cam, an urging means such as a spring is provided as appropriate to keep the cam follower 32c in contact with the cam 32a at all times.

The container holding portion 72 includes a circular plate portion 72a that is in contact with the bottom portion 11b of the aerosol container 10, an annular convex portion 72b that holds the bottom-side end portion of the body portion 11a of the aerosol container 10 from the outer-diameter end portion of the circular plate portion 72a, and a connecting shaft portion 72c that is formed at the center portion of the motor-side surface of the circular plate portion 72a, wherein the cam follower 32c is provided on the connecting shaft portion 72c.

Normally, the smallest diameter portion of the cam 32a is in contact with the cam follower 32c, and the container holding portion 72 is in a retracted limit position, so that a valve mechanism of the aerosol container 10 is held in a closed state. By rotating the cam 32a by the motor 31, the container holding portion 72 is caused to move forward in the axial direction. That is, the contact position of the cam 32a with which the cam follower 32c comes into contact at the retracted limit position is set to have a smaller radius from the center of rotation, and the contact position of the cam 32a with which the cam follower 32c comes into contact at the forward limit position is set to have a larger radius from the rotation center. In the illustrated example, the valve mechanism is opened not at the largest diameter portion of the cam 32a but at a transition portion from the smallest diameter portion to the largest diameter portion, but it may be configured to open at the largest diameter portion.

The aerosol container 10 is moved to the head side in the axial direction by the forward movement of the container holding portion 72, so that the actuator 14 is pressed against the tubular body 221a of the pressing member 221 by the movement of the aerosol container 10. Since the pressing member 221 is fixed to the first end cover portion 22 of the sleeve 20, the stem 12 is pushed into the aerosol container 10 by reaction from the tubular body 221a, so that the valve mechanism in the aerosol container 10 is opened. When the valve mechanism is opened, the content is automatically discharged by the gas pressure.

[Configuration of Valve Mechanism]

Figure 3A:
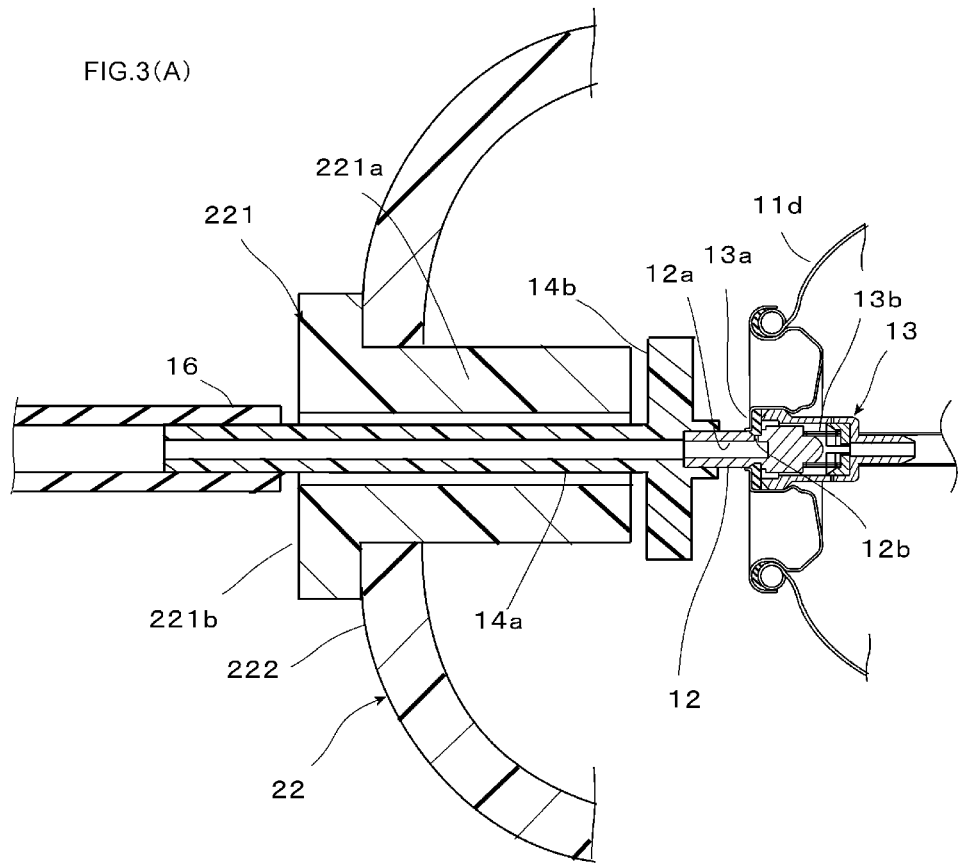
FIG. 3 (A) is a view illustrating an example of a valve mechanism of the aerosol container of FIG. 2, and FIG. 3 (B) is a view illustrating an example of using a power supply for a flight control unit.
Figure 3B:
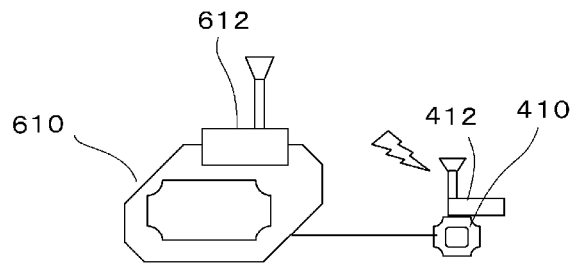

FIG. 3 (A) shows an example of the valve mechanism 13 of the aerosol container 10 which is opened by the discharge drive unit 30.

That is, the stem 12 is formed with a discharge flow passage 12a extending by a predetermined length in the axial direction thereof from its tip opening portion, and a stem hole 12b, which serves as a valve hole, is opened through the side surface of the stem 12, wherein the stem hole 12b is sealed by the inner peripheral surface of a gasket 13a mounted on the hole edge of an insertion hole in a mounting cup 11d.

Normally, the stem 12 is urged in a protruding direction by the gas pressure and the urging force of a spring 13b, and the inner peripheral edge of the gasket 13a, which serves as a valve body, is pressed in the axial direction, so that the inner peripheral surface of the gasket 13a comes into close contact with the hole edge of the stem hole 12b, which constitutes a valve seat, thereby maintaining a valve closed state.

When a movable plate 32b is moved to a forward limit by the cam mechanism 32 of the discharge drive unit 30, the aerosol container 10 is caused to move toward the first end cover portion 22, so that the flange portion 14b of the flanged actuator 14 come into contact with the end surface of the pressing member 221, and the stem 12 is relatively pushed toward the inside of the container by a reaction force thereof. When the stem 12 is pushed in, the inner peripheral edge of the gasket 13a is bent or flexed toward the inside of the container, so that the inner peripheral surface of the gasket 13a is moved away from the hole edge of the stem hole 12b to open the valve mechanism, whereby the content pushed by the gas pressure is discharged from the discharge flow passage 12a in the stem 12.

The valve mechanism 13 in the illustrated example is an example, and is not limited to such a configuration, but various configurations can be applied in which the valve mechanism is normally maintained in a closed state, and is opened by pushing in the stem 12.

In this example, the rotational motion of the motor 31 is converted into linear motion by the cam mechanism 32, but the present invention is not limited to the cam mechanism 32, and can be applied to any mechanism that converts the rotational motion of the motor 31 into linear motion, such as a screw feed mechanism, a rack and pinion or the like. In addition, instead of the rotary motor, a linear drive source such as a linear motor for linear drive, an electromagnetic solenoid or the like may be used to move the aerosol container 10 in the axial direction without using a motion conversion mechanism.

[Other Methods or Configurations for Discharge Drive Unit]

The discharge drive unit 30 illustrated in FIG. 2 (A) is an example, and other configurations may be applied as the configuration of the discharge drive unit 30.

That is, in FIG. 2 (A), the aerosol container 10 is caused to move inside the sleeve 20, but the aerosol container 10 may be fixed and the actuator 14 may be pushed in, or the valve mechanism of the aerosol container 10 may be held in a normally open state, wherein discharge and stop may be switched by an external valve, instead of a configuration in which the aerosol container 10 is mechanically caused to move.

Figure 4:
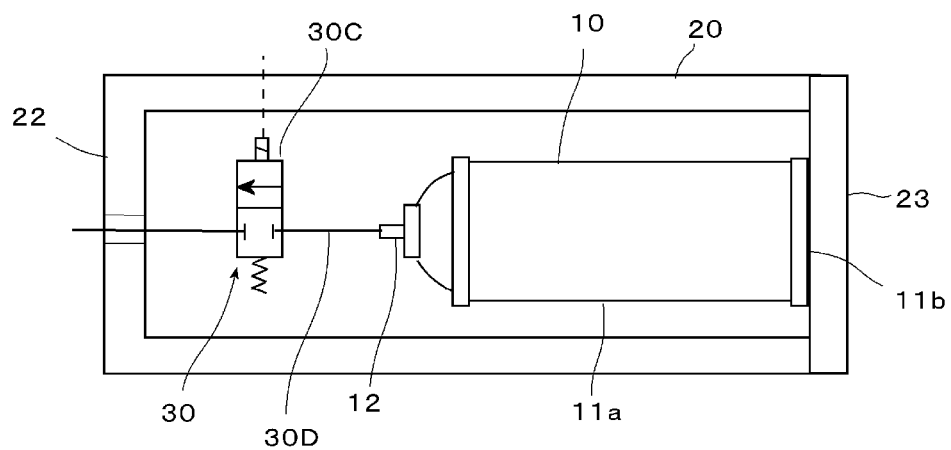
FIG. 4 is a view illustrating another method of a discharge drive unit.

In FIG. 4, the discharge drive unit 30 is driven not by the valve mechanism 13 inside the aerosol container 10 but by an external valve 30C. As illustrated in the figure, a two-way switching valve, which switches between a stop position and a discharge position by means of a solenoid, can be used as the external valve 30C. Normally, the valve is held at the stop position, and at the time of discharge, it is switched to the discharge position by driving the solenoid to discharge the content. When using such an external valve 30C, it is easy to install or mount the aerosol container 10 and also easy to control the opening and closing of the valve, since the stem 12 of the aerosol container 10 is simply connected to a pipe conduit 30D. In the case of using the existing aerosol container 10, for example, it is configured such that when assembling the aerosol container 10, the stem 12 is pushed in so as to hold the internal valve in a normally open state.

[Electric Equipment]

Next, referring back to FIG. 1 (B), electric equipment for driving the discharge drive unit 30 will be described. FIG. 1 (B) conceptually illustrates the electric equipment that is mounted on the aerial vehicle.

A discharge apparatus control unit 410, which controls the discharge apparatus such as the discharge drive unit 30, the camera 106 and the like, is provided separately from the flight control unit 610, which controls the flight of the aerial vehicle 100, and is provided on the side of the airframe 101 together with the flight control unit 610. In addition, a discharge apparatus power supply 411 for driving the discharge drive unit 30 is provided separately from a power supply for driving the aerial vehicle 100 (which is assumed to be incorporated in the flight control unit 610 and is not illustrated) and is mounted on the side of the airframe 101.

Moreover, a discharge apparatus communication unit 412 including an antenna for remotely operating the discharge apparatus 1 and the camera 106 is provided separately from a flight communication unit 612 including an antenna for remotely operating the aerial vehicle 100, and is mounted on the airframe 101.

A part or all of the flight control unit 610, the flight communication unit 612, and the flight power supply may have the roles of the discharge apparatus control unit 410, the discharge apparatus communication unit 412, and the discharge apparatus power supply 411. FIG. 3 (B) illustrates an example in which a power supply arranged in the flight control unit 610 is shared.

[Structure for Supporting Airframe]

Although not particularly illustrated, the aerosol container assembly 40 may be attached to the airframe 101 by, for example, a sliding type fitting structure including a slide rail and a T-shaped groove, a structure such as bayonet coupling in which engagement and disengagement can be performed in a rotational direction, or various support means such as screw fastening, clip coupling, clamping, etc., which facilitate detachment and attachment, can be applied.

Electrical contacts may be provided to electrically connect the discharge apparatus control unit 410 and the discharge apparatus power supply 411 arranged on the airframe 101 side to the motor 31 of the discharge drive unit 30 or the like, or they may be connected directly from the sleeve 20 to a connector arranged on the airframe 101 by a cable or the like. In addition, a power supply such as a secondary battery and a wireless communication device may be provided in the sleeve 20, and electric signals from the flight control unit 610 arranged on the airframe 101 side may be transmitted and received to and from the discharge apparatus control unit 410 in the sleeve 20 by wireless communication.

The nozzle 15 is supported by a front portion of the airframe through the nozzle support portion 50. The nozzle support portion 50 may also have a sliding type fitting structure including a slide rail and a T-shaped groove, a structure such as bayonet coupling in which engagement and disengagement can be performed in a rotational direction, or various support means such as screw fastening, clip coupling, clamping, etc., which facilitate detachment and attachment, can be applied. If this nozzle support portion 50 is configured to include a direction changing device such as a gimbal, the direction can be controlled.

Next, the operation of the discharge apparatus for an aerial vehicle according to the present invention will be described.

[Replacement Work]

In advance, a replacement aerosol container assembly 40 with the aerosol container 10 accommodated in the sleeve 20 is prepared, as illustrated in FIG. 2 (A). In the replacement work, the aerosol container assembly 40 is detached from the airframe fuselage 102, and a new aerosol container assembly 40 is attached. In cases where the nozzle 15 is also replaced, the nozzle 15 is detached from the nozzle support portion 50, and the aerosol container assembly is then detached together with the nozzle 15 and the tube. After replacement, the aerosol container assembly 40 is disposed of by removing the aerosol container 10 from the sleeve 20 and completely releasing the gas and content therein. The sleeve 20 can be used repeatedly. Also, in this embodiment, only the aerosol container 10 can be replaced while the sleeve 20 is fixed to the airframe 101.

[Spraying Work]

Next, spraying work will be described with reference to FIG. 5. FIG. 5 (A) is an explanatory view illustrating an example of remote control of a first operation terminal and a second operation terminal for the aerial vehicle equipped with the discharge apparatus, and FIG. 5 (B) is a simple control block diagram.

[Spraying Work]

In the spraying work, for example, as illustrated in FIG. 5, the flight of the aerial vehicle 100 is remotely operated by the first operation terminal (control terminal) 510, and the discharge apparatus 1 is remotely operated by the second operation terminal 520. The first operation terminal 510 controls the flight of the known aerial vehicle 100, wherein by operating levers 511, 512, operation signals are transmitted from an antenna 513 to the flight communication unit 612 for remote operation. This first operation terminal 510 is provided with a display 514 that displays images taken by the camera 106. The second operation terminal 520 is also used as a controller for the camera 106 mounted on the aerial vehicle 100. That is, by operating the levers 521, 522 while viewing the images on a display 524, an operator can remotely control the camera 106 by transmitting operation signals from an antenna 523 to the discharge apparatus communication unit 412. The second operation terminal 520 is provided with, for example, a discharge button 525 and a stop button 526. When the operator sets a target while viewing the images on the display 524 and presses a discharge button 525, a discharge command signal is transmitted from the antenna 523, and is received by the discharge apparatus communication unit 412 mounted on the aerial vehicle 100. Based on the discharge command signal thus received, the discharge drive unit 30 is driven by the discharge apparatus control unit 410, so that the stem 12 of the aerosol container 10 is pushed in to discharge the content. When the stop button 526 is pressed, a stop command signal is transmitted, so that the pushing of the stem 12 is released by the discharge drive unit 30 to stop the discharge.

The discharge and stop can be switched not only by operating a button but also automatically according to a program stored in advance. For example, a flight route may have been programmed in advance, and a position on a map may be detected by signals from a GPS and a height may be detected by an altimeter, so that discharge may be started when a predetermined position is reached, and the discharge may be stopped when the discharge in a predetermined area has been completed.

Next, another embodiment of the discharge apparatus for an aerial vehicle according to the invention of the first solution will be described. In the following description, only differences from the above-mentioned first embodiment will be mainly described, wherein the same components will be denoted by the same reference signs, and the description thereof will be omitted.

Second Embodiment of First Solution

Figure 6A:
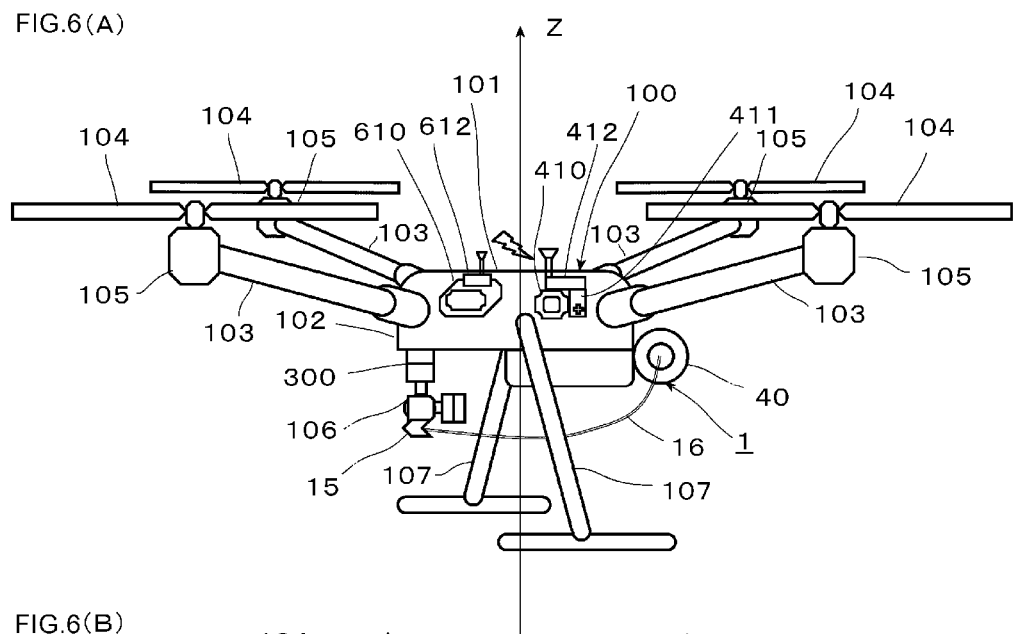
FIG. 6 (A) is an overall configuration view illustrating, as a perspective view, an aerial vehicle in a discharge apparatus for an aerial vehicle according to a second embodiment of the invention of the first solution, and FIG. 6 (B) is a bottom view thereof.
Figure 6B:
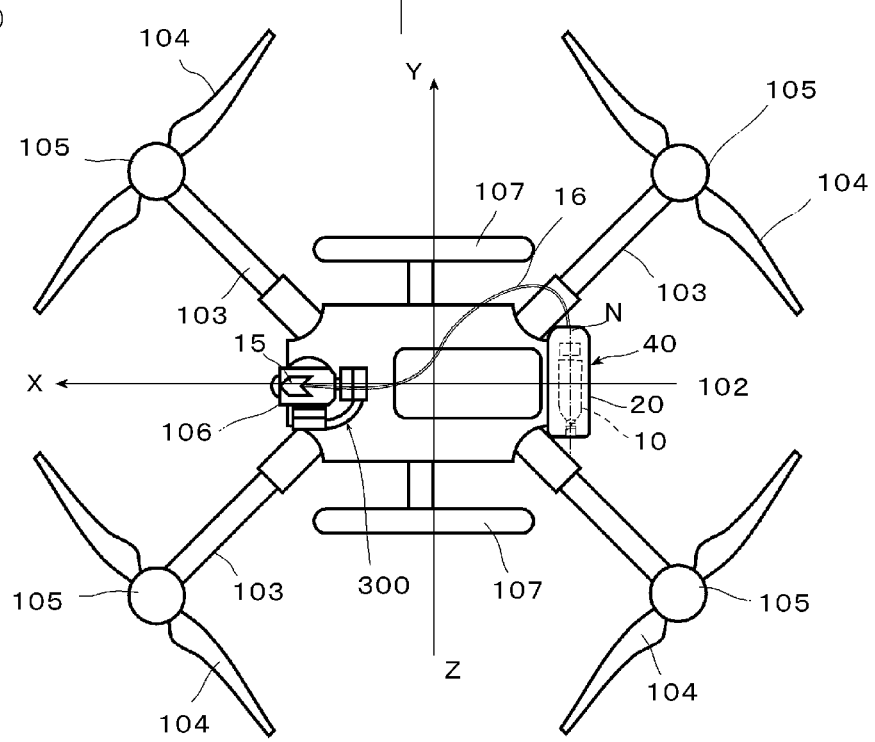

FIG. 6 illustrates a discharge apparatus for an aerial vehicle according to a second embodiment of the invention of the first solution, wherein FIG. 6 (A) is an overall configuration view illustrating the aerial vehicle as a perspective view, and FIG. 6 (B) is a bottom view thereof.

This second embodiment is the same as the first embodiment in that an aerosol container assembly 40 incorporating an aerosol container is mounted on a rear surface of an airframe fuselage 102, and that a nozzle 15 is attached to a front end portion of the airframe fuselage 102, but the second embodiment differs from the first embodiment in that the nozzle 15 is attached to a camera 106 that is supported on a front end portion of a lower surface of the airframe fuselage 102 through a direction changing device 300.

The direction changing device 300 is a three-axis gimbal, has a degree of freedom of rotation about three axes orthogonal to each other, and can orient the camera 106 in any direction with respect to the airframe fuselage 102.

Figure 7A:
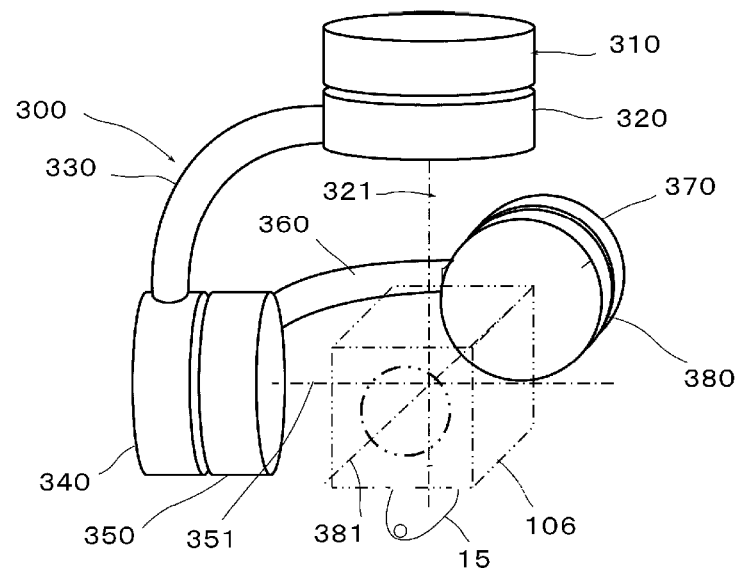
FIG. 7 (A) is a view illustrating a direction changing device of FIG. 6, and FIG. 7 (B) is a view illustrating another configuration example of the direction changing device.
Figure 7B:
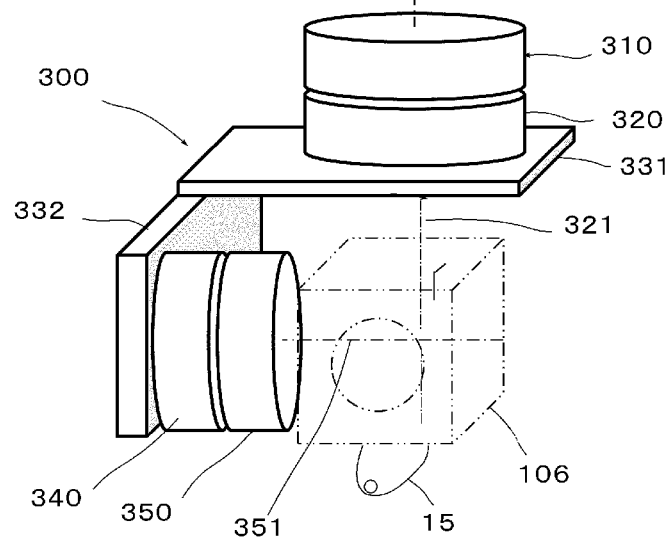

FIG. 7 (A) is a schematic view illustrating a configuration example of the direction changing device of FIG. 6, and FIG. 7 (B) is a schematic view illustrating another configuration example of the direction changing device.

That is, the direction changing device has a first rotating body 320 connected to a first motor 310 attached to the airframe fuselage 102, a second motor 340 connected to the first rotating body 320 through a first arm 330, and a second rotating body 350 connected to the second motor 340. Further, the direction changing device also has a third motor 370 connected to the second rotating body 350 through a second arm 360, and a third rotating body 380 connected to the third motor 370. The camera 106 is held by the third rotating body 380 through a mounting member or the like, and the nozzle 15 is held by the camera 106.

In this way, when the direction of the camera 106 is changed, the nozzle 15 moves in synchronization with the camera 106, so that the discharge direction of the nozzle 15 is changed following the camera 106, and the discharge state can always be visually recognized within the visual field range of the camera 106.

The configuration is such that a rotation center line of the first rotating body 320, a rotation center line of the second rotating body 350, and a rotation center line (rotation axis line) of the third rotating body 380 are orthogonal to each other, and extension lines 321, 351, 381 thereof intersect at a single point. In addition, in this example, the direction changing device 300 changes the direction of the camera 106, wherein the optical axis of the camera 106 coincides with the extension line 381 of the rotation center line of the third rotating body 380.

Note that the extension lines 321, 351, 381 of the rotation center lines of the first rotating body 320, the second rotating body 350, and the third rotating body 380 do not have to intersect with each other, and for the direction changing device 300, its rotation axes do not have to be three axes, but can be two axes or even one axis.

FIG. 7 (B) illustrates an example of a simple two axis direction changing device 300, which includes a first motor 310 attached to the airframe fuselage 102, a first rotating body 320 connected to the first motor 310, a second motor 340 connected to the first rotating body 320 through plate-like members 331, 332, and a second rotating body 350 connected to the second motor 340.

It is similar to the three axis gimbal in that the first rotor 320 is rotationally driven by the first motor 310 and the second rotor 350 is rotationally driven by the second motor 340, but the configuration is such that an extension line 321 of a rotation center line of the first rotor 320 and an extension line 351 of a rotation center line of the second rotor 350 do not intersect with each other. In addition, the first rotating body 320 and the second motor 340 are connected by the plate-shaped members 331, 332, which is an inexpensive configuration example.

Third Embodiment of First Solution

Figure 8A:
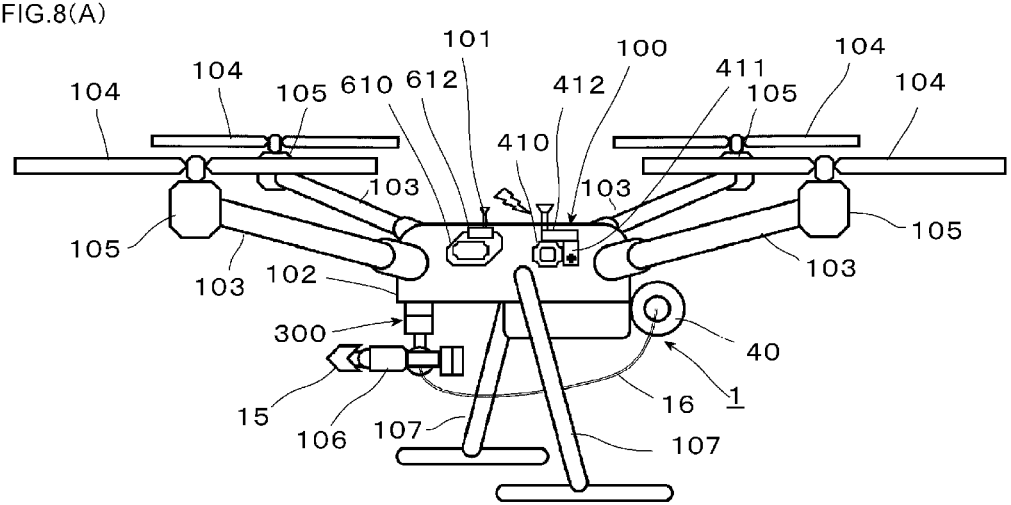
FIG. 8 (A) is an overall configuration view illustrating, as a perspective view, an aerial vehicle in a discharge apparatus for an aerial vehicle according to a third embodiment of the invention of the first solution, and FIG. 8 (B) is a bottom view thereof.
Figure 8B:
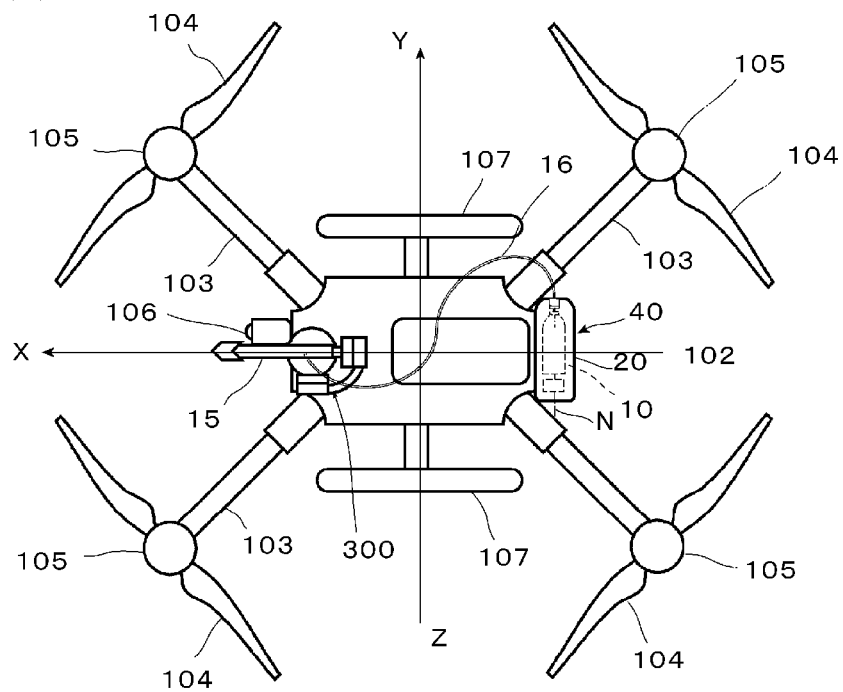

FIG. 8 illustrates a discharge apparatus for an aerial vehicle according to a third embodiment of the invention of the first solution. FIG. 8 (A) is an overall configuration view illustrating the aerial vehicle as a perspective view, and FIG. 8 (B) is a bottom view thereof.

This third embodiment is also the same as the first embodiment in that an aerosol container assembly 40 incorporating an aerosol container is mounted on a rear surface of an airframe fuselage 102, and that a nozzle 15 is attached to a front end portion of the airframe fuselage 102, similarly to the first embodiment, but is different in that the nozzle 15 is supported on the front end portion of the airframe fuselage 102 through a direction changing device 300, and that a camera is attached to the nozzle 15.

In this way, when the direction of the nozzle 15 is changed, the camera 106 moves in synchronization with the nozzle 15, so that the camera 106 follows the discharge direction of the nozzle 15, and the discharge state can always be visually recognized within the visual field range of the camera 106.

In particular, in this embodiment, an extension line of a central axis of the nozzle 15 intersects with an intersection point of extension lines 321, 351, 381 of rotation center lines of a first rotating body 320, a second rotating body 350, and a third rotating body 380.

With such a configuration, a discharge reaction force from the nozzle 15 at the time of discharging a content acts on the rotation centers of the first motor 310, the second motor 340, and the third motor 370. Therefore, there is an advantage in that there is no possibility that the holding torques of the first motor 310, the second motor 340, and the third motor 370 are defeated due to the moment caused by the discharge reaction force to cause the directions of the nozzle 15 and the camera 106 to swing.

Fourth Embodiment of First Solution

Figure 9:
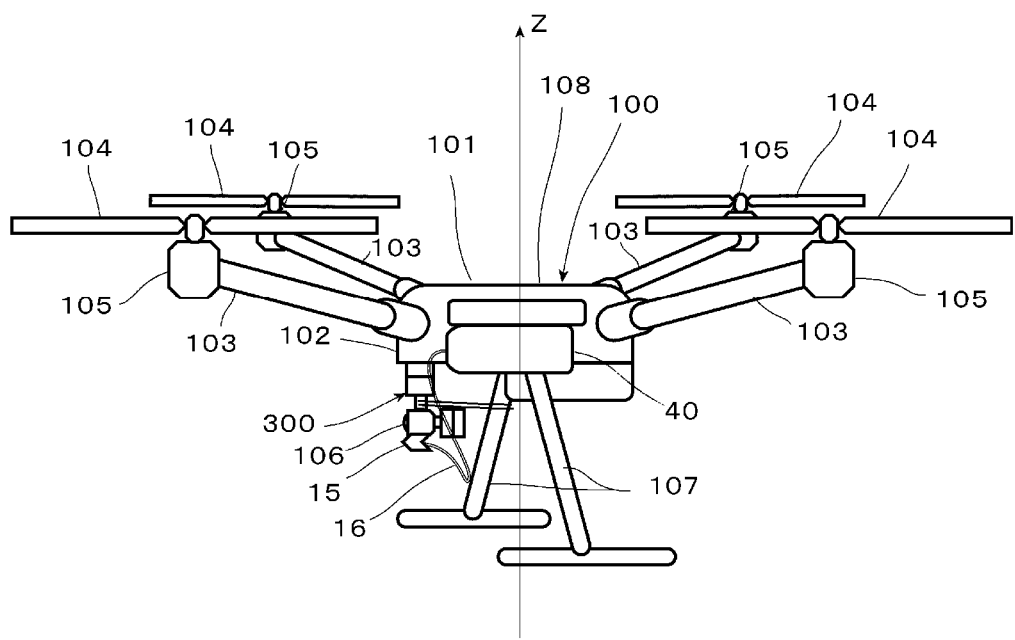
FIG. 9 is an overall configuration view illustrating, as a perspective view, an aerial vehicle in a discharge apparatus for an aerial vehicle according to a fourth embodiment of the invention of the first solution.
Figure 10A:
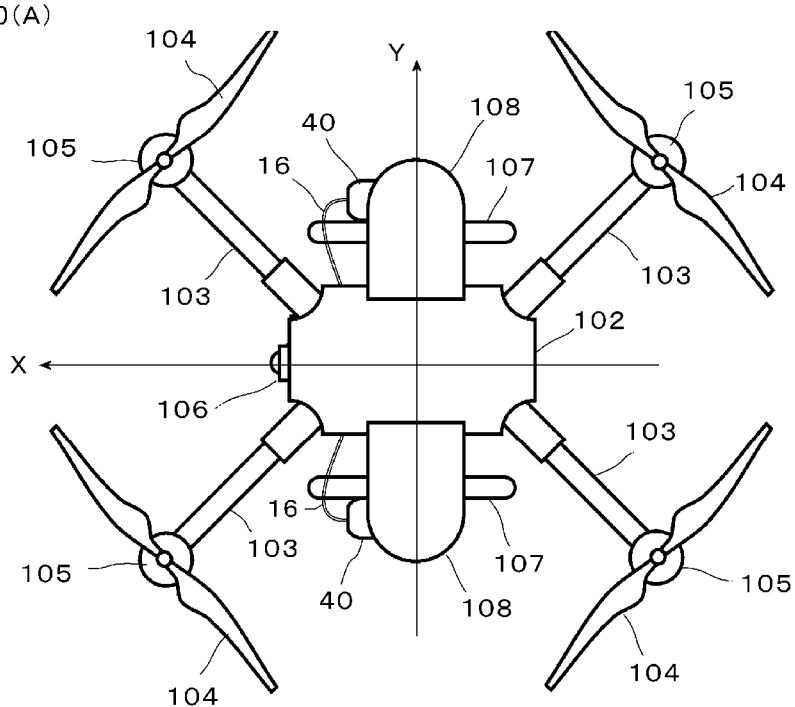
FIG. 10 (A) is a plan view of the apparatus of FIG. 9, and FIG. 10 (B) is a bottom view thereof.
Figure 10B:
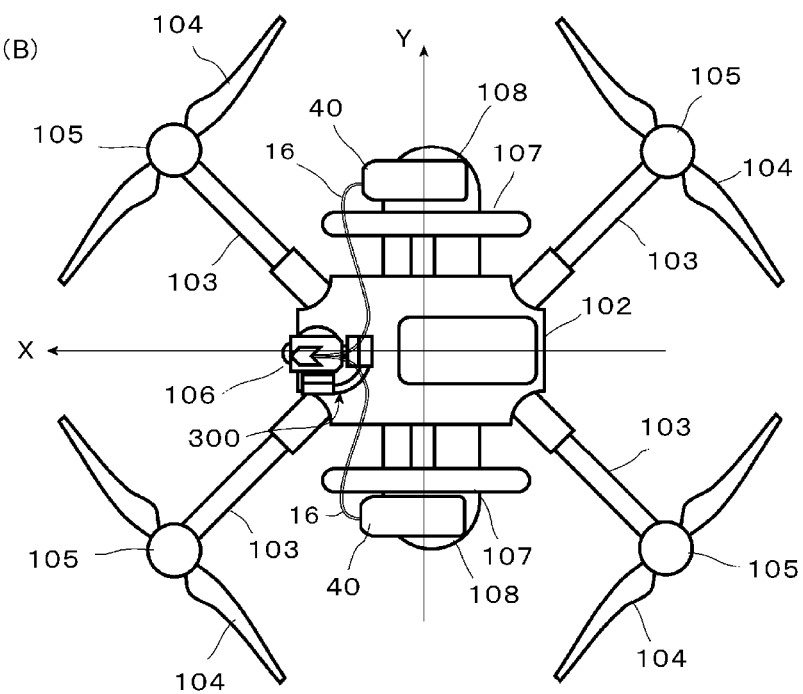

FIGS. 9 and 10 illustrate a discharge apparatus for an aerial vehicle according to a fourth embodiment of the invention of the first solution, wherein FIG. 9 is an overall configuration view illustrating the aerial vehicle as a perspective view, FIG. 10 (A) is a plan view of the apparatus of FIG. 9, and FIG. 10 (B) is a bottom view thereof.

This fourth embodiment is similar to the second embodiment in that a nozzle 15 is attached to a camera supported on a front end portion of an airframe fuselage 102 through a direction changing device 300, but differs from the second embodiment in that aerosol container assemblies 40 each including an aerosol container 10 are mounted on winglets or small wings 108, respectively, which are extension portions extending from the airframe fuselage 102.

The small wings 108 are portions that protrude and extend from the left and right side surfaces of the airframe fuselage 102 in a direction parallel to its pitch axis, wherein in the illustrated example, a total of two aerosol container assemblies 40 are mounted on the lower surfaces of the left and right small wings 108. Then, two tubes 16 connected to the aerosol container assemblies 40, respectively, merge to be connected to the one nozzle 15.

In this way, only one nozzle 15 is required, and the piping configuration can be simplified.

Figure 11A:
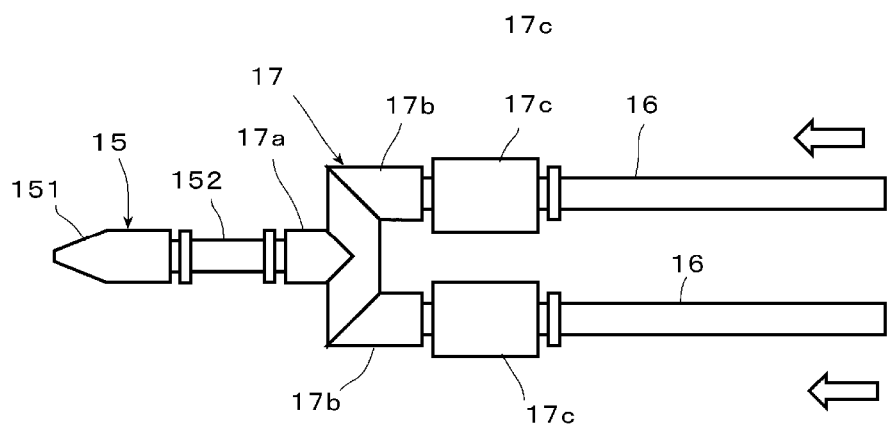
FIG. 11 (A) is an explanatory view of a joint portion of a plurality of tubes of the apparatus of FIG. 10, and FIG. 11 (B) is a cross-sectional view of a one-way valve.
Figure 11B:
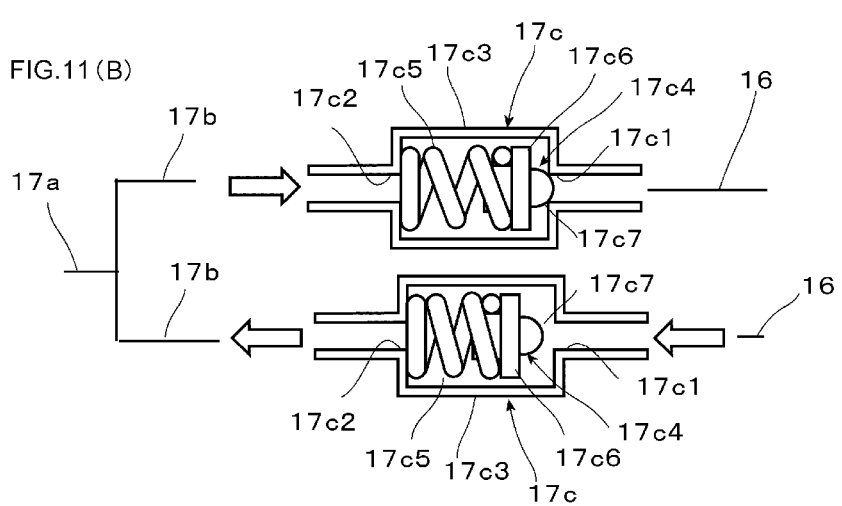

FIG. 11 illustrates an example of a joint portion 17 arranged at a merging portion of the tubes 16. FIG. 11 (A) is a view illustrating a piping configuration, and FIG. 11 (B) is a cross-sectional view of a one-way valve.

That is, the joint portion 17 is a bifurcated member that has one outlet side pipe portion 17a to which the nozzle is connected, and two inlet side pipe portions 17b, 17b to which the tubes 16, 16 are connected, wherein one-way valves 17c, 17c are provided in the two inlet side pipe portions 17b, 17b, respectively.

These two one-way valves 17c, 17c have the same configuration, and allow a flow in a discharge direction that exceeds a predetermined pressure, but block a flow in a direction opposite to the discharge direction, wherein for example, as illustrated in FIG. 11 (B), in a housing 17c3 provided with an inlet port 17c1 and an outlet port 17c2, there are arranged a valve body 17c4 that comes into and out of contact with the hole edge of the inlet port 17c1, and a spring 17c5 that brings the valve body 17c4 into contact with the hole edge of the inlet port 17c1 and maintains it in a valve closed state at all times. The valve body 17c4 has a spring receiving portion 17c6 for receiving the spring 17c5, and a hemispherical convex portion 17c7, wherein the convex portion 17c7 opens and closes the inlet port 17c1.

Therefore, when a content is sent from one of the tubes 16, the content is discharged from the nozzle 15 through the corresponding one of the one-way valves 17c (the lower side in FIG. 11 (B)) to which the content is sent. This discharge pressure also acts on the other one-way valve 17c (the upper side in FIG. 11 (B)), but is in the direction of closing the other one-way valve 17c, so that backflow can be prevented.

Fifth Embodiment of First Solution

Figure 12A:
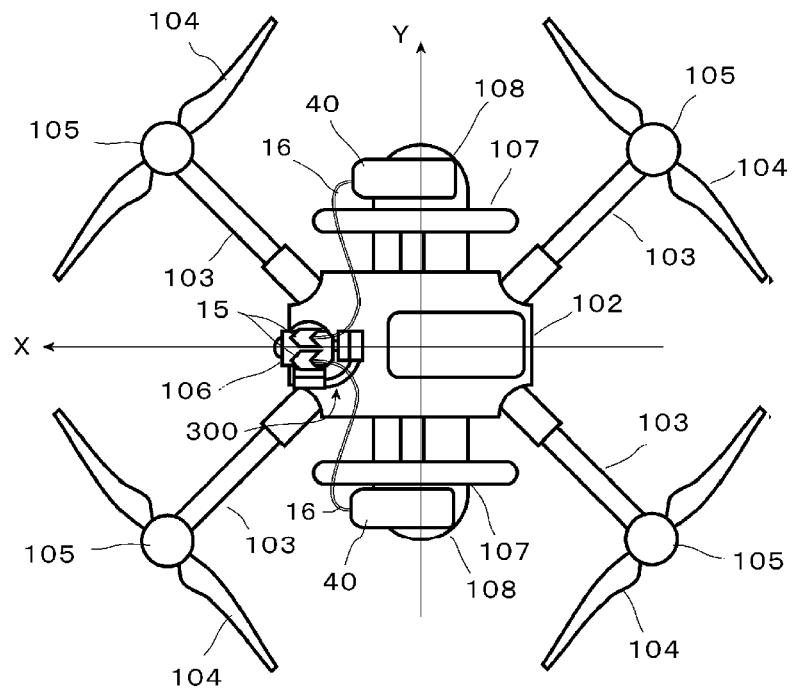
FIG. 12 (A) is a bottom view of an aerial vehicle with a discharge apparatus for an aerial vehicle mounted thereon according to a fifth embodiment of the invention of the first solution, and FIG. 12 (B) is a schematic perspective view of a nozzle holding portion that holds a plurality of nozzles.
Figure 12B:
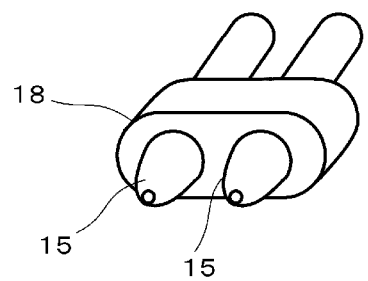

FIG. 12 illustrates a discharge apparatus for an aerial vehicle according to a fifth embodiment of the invention of the first solution, wherein FIG. 12 (A) is a bottom view of the aerial vehicle, and FIG. 12 (B) is a schematic perspective view of a nozzle holding portion for holding a plurality of nozzles.

This fifth embodiment is the same as the fourth embodiment in that the nozzles 15 are attached to a camera 106 supported at a front end portion of an airframe fuselage 102 through a direction changing device 300, and that two aerosol container assemblies 40 each including an aerosol container 10 are mounted on small wings 108, respectively, which are extension portions extending from the airframe fuselage 102, but is different in that two nozzles 15, 15 are provided for tubes 16, 16, respectively.

FIG. 12 (B) illustrates a nozzle holding member 18 that supports the two nozzles 15, 15, and is supported by the camera 106 through the nozzle holding member 18.

Figure 13A:
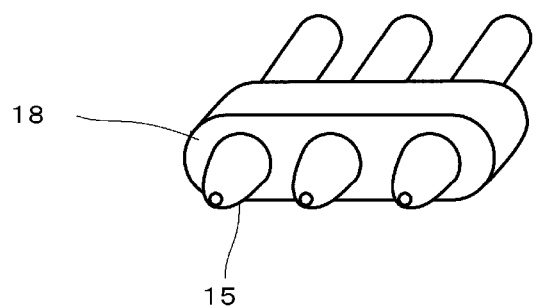
FIG. 13 (A) and FIG. 13 (B) are schematic perspective views illustrating other configuration examples of the nozzle holding portion.
Figure 13B:
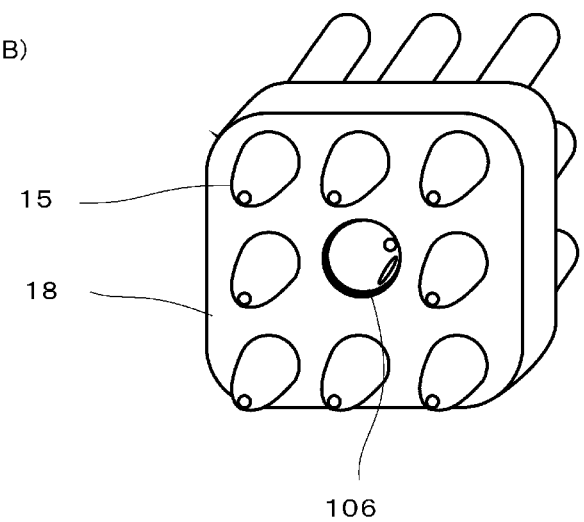

FIGS. 13 (A) and 13 (B) are schematic perspective views illustrating other configuration examples of the nozzle holding member 18.

FIG. 13 (A) illustrates an example of the nozzle holding member 18 that holds three nozzles 15 in a row, and FIG. 13 (B) illustrates an example of the nozzle holding member 18 that holds three rows of three nozzles 15 in a two dimensional configuration, in which a lens of the camera 106 is arranged at the center instead of a nozzle 15, so that the camera 106 is surrounded by eight nozzles 15 in a square shape.

Sixth Embodiment of First Solution

Figure 14:
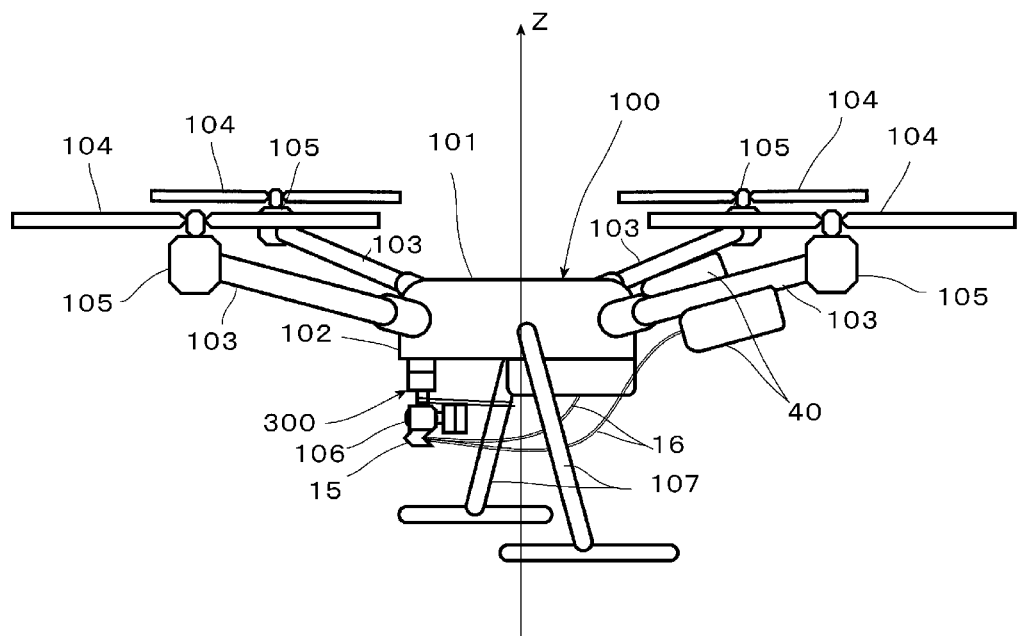
FIG. 14 is an overall configuration view illustrating, as a perspective view, an aerial vehicle in a discharge apparatus for an aerial vehicle according to a sixth embodiment of the invention of the first solution.
Figure 15A:
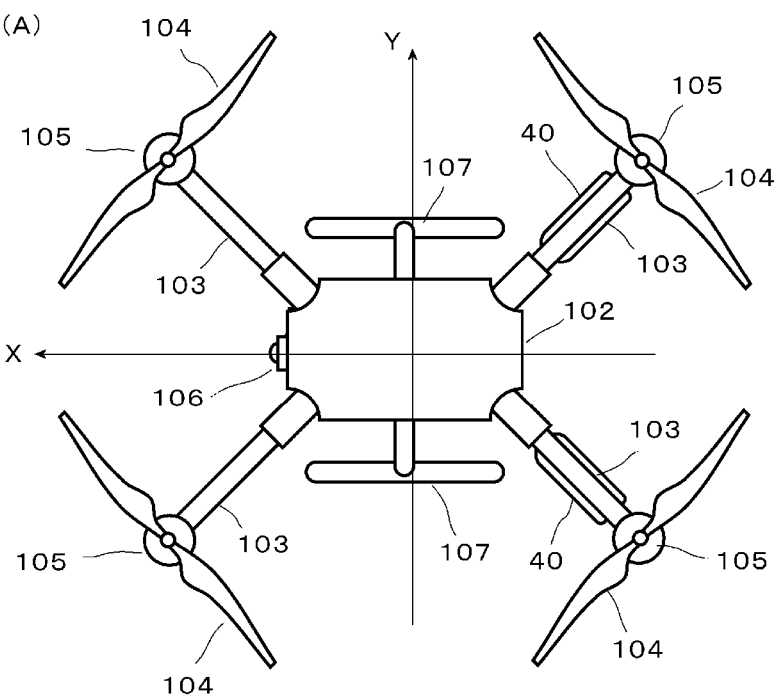
FIG. 15 (A) is a plan view of the aerial vehicle of FIG. 14.
FIG. 15(B) is a bottom view thereof.
Figure 15B:
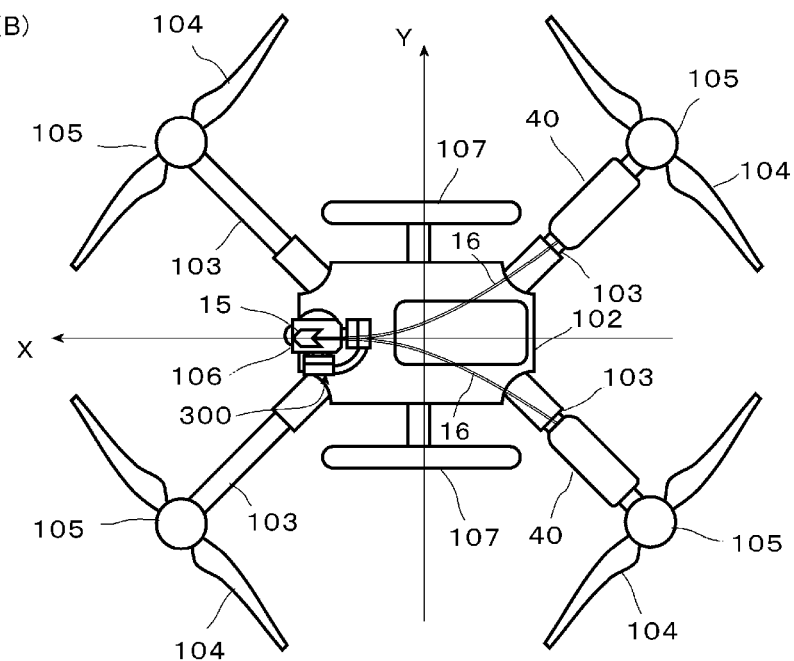

FIGS. 14 and 15 illustrate a discharge apparatus for an aerial vehicle according to a sixth embodiment of the invention of the first solution, wherein FIG. 14 is an overall configuration view illustrating the aerial vehicle as a perspective view, FIG. 15 (A) is a plan view of the aerial vehicle, and FIG. 15 (B) is a bottom view thereof.

This sixth embodiment is the same as the fourth embodiment in that a nozzle 15 is attached to a camera 106 supported at a front end portion of an airframe fuselage 102 through a direction changing device 300, that two aerosol container assemblies 40 each having an aerosol container 10 are mounted on extension portions, respectively, which extend from the airframe fuselage 102, and that tubes 16 from respective aerosol container assemblies 40 merge into the one nozzle 15, but is different in that the aerosol container assemblies are mounted on arms 103 which act as the extension portions extending from the airframe fuselage 102 to support rotor blades 104. In the illustrated example, the aerosol container assemblies are mounted on rear two arm portions 103, but may be mounted on the front arm portions 103.

By using the arm portions 103 as the mounting positions for the aerosol container assemblies 40 in this manner, it is possible to effectively utilize the space for mounting the aerosol container assemblies 40.

Seventh Embodiment of First Solution

FIG. 16 illustrates a discharge apparatus for an aerial vehicle according to a seventh embodiment of the invention of the first solution. FIG. 16 (A) is an overall configuration view illustrating an aerial vehicle as a perspective view, and FIG. 16 (B) is a view seen from the direction of an arrow B in FIG. 16 (A).

This seventh embodiment is similar to the third embodiment (FIG. 8) in that a nozzle 15 is supported by an airframe fuselage 102 through a direction changing device 300, but is different in that an aerosol container assembly 40 is mounted on a landing leg 107 that is an extension portion extending from the airframe fuselage 102, and further in that a camera 106 is supported by another direction changing device 300 that is separate from the direction changing device 300 for the nozzle 15.

The direction changing device 300 for the camera 106 and the direction changing device 300 for the nozzle 15 are mounted on a mounting frame 109 fixed to a lower surface of the airframe fuselage 102 so as to be arranged side by side adjacent to each other.

In this way, when the direction changing device 300 for the nozzle 15 is provided separately from the direction changing device 300 for the camera 106, it is possible to move the nozzle 15 in synchronization with the camera 106, or to control the direction of the nozzle 15 without synchronizing the nozzle 15 with the camera 106.

As described above, in the first through third embodiments, examples have been described in which only one aerosol container assembly 40 is mounted on the rear surface of the fuselage 102, but it is needless to say that a plurality of aerosol container assemblies 40 may be mounted, and not only the rear surface but also the lower surface, the upper surface, and the front surface of the fuselage 102 may be used for mounting. In this case, there can be applied a configuration in which a plurality of tubes are merged into one nozzle as described in the fourth embodiment, a configuration in which a plurality of nozzles are arranged adjacent to each other as described in the fifth embodiment, and a configuration in which a nozzle or nozzles are arranged adjacent to a camera.

Further, from the point of view of mounting a plurality of aerosol container assemblies 40, as illustrated in the fourth through sixth embodiments, it is also possible to mount a plurality of aerosol container assemblies 40 not only on an airframe fuselage 102, but also on at least one of small wings 108, arm portions 103, and leg portions 107 extending from the airframe fuselage 102.

In addition, in the case of arrangements of a plurality of aerosol container assemblies, mounting thereof on the airframe fuselage 102, the small wings 108, the arm portions 103, or the leg portions 107 may be combined with each other as appropriate to form multiple mounting.

Also, in this case, as described in the fourth through sixth embodiments, a plurality of nozzles may be merged into one nozzle, or a plurality of nozzles can be collectively arranged at positions adjacent to a camera.

Inventions of Second Solution

Next, the inventions of the second solution will be described in detail based on embodiments illustrated in the drawings.

The dimensions, materials, shapes, relative arrangements, etc., of the components described in the following embodiments should be changed as appropriate depending on the configuration and various conditions of an apparatus to which the invention is applied, and are not intended to limit the scope of the invention to the following embodiments.

In a first invention of this second solution, a plurality of aerosol containers are mounted, and a plurality of tubes are connected at their one ends to the plurality of aerosol containers, respectively, and at their other ends to one nozzle. In a second invention thereof, a plurality of aerosol containers are mounted, and a plurality of nozzles connected to a plurality of tubes, which are connected to the plurality of aerosol containers, are collectively arranged adjacent to a camera mounted on an airframe.

Although the above-mentioned fourth and sixth embodiments of the first solution have been described as embodiments of the invention of the first solution, they are also applicable to embodiments of the first invention of the second solution. In addition, the fourth and fifth embodiments of the first solution are also applicable to embodiments of a second invention of the second solution. In the following description, embodiments other than the above-mentioned fourth through sixth embodiments will be described.

First Embodiment

Figure 17A:
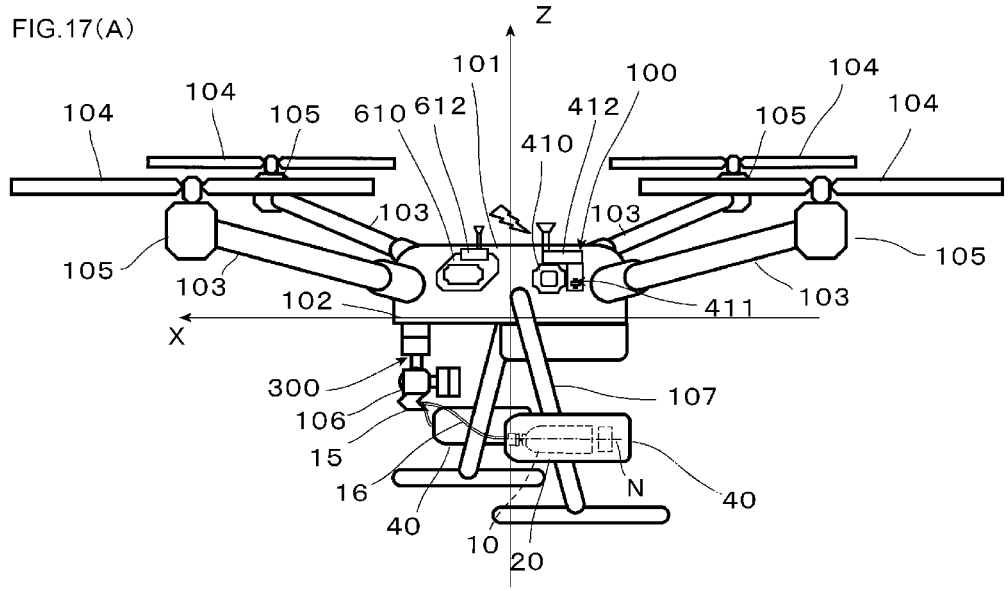
FIG. 17 conceptually illustrates a discharge apparatus for an aerial vehicle according to a first embodiment of an invention of a second solution, wherein FIG. 17 (A) is an overall configuration view illustrating the aerial vehicle as a perspective view, and FIG. 17 (B) is a bottom view thereof.
Figure 17B:
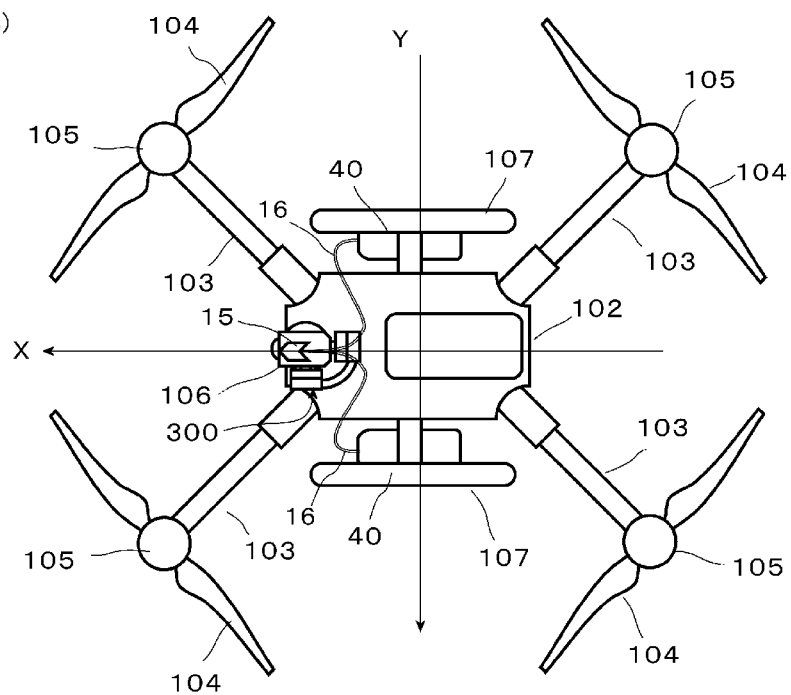

First, an overall configuration will be described with reference to FIGS. 17 and 18. FIG. 17 conceptually illustrates a discharge apparatus for an aerial vehicle according to a first embodiment of the invention of the second solution, wherein FIG. 17 (A) is an overall configuration view illustrating the aerial vehicle as a perspective view, FIG. 17 (B) is a bottom view thereof, FIG. 18 (A) is a plan view thereof, and FIG. 18 (B) is a view seen from the front. Hereinafter, description will be made mainly with reference to FIG. 17 and supplementarily with reference to FIG. 2.

Figure 18A:
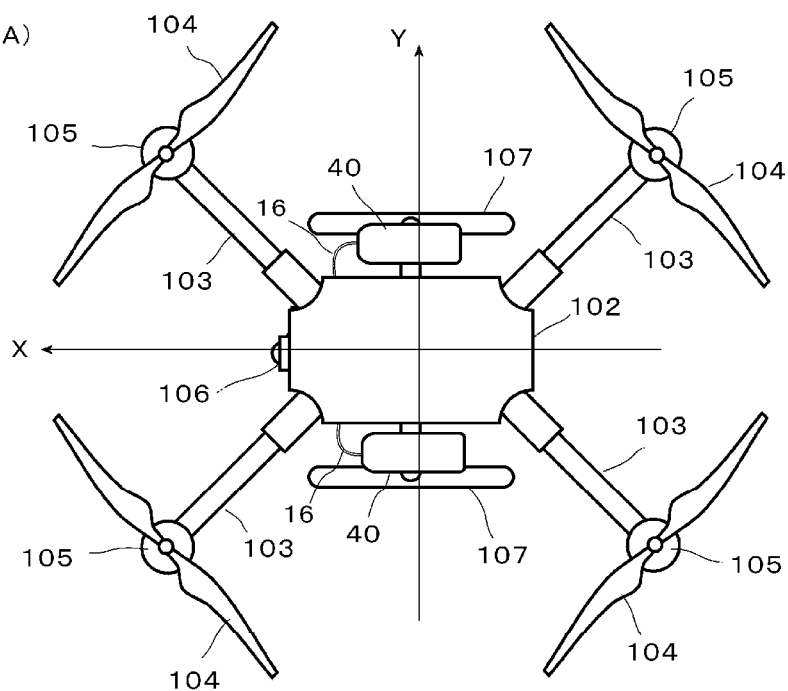
FIG. 18 (A) is a plan view of the apparatus of FIG. 17, and FIG. 18 (B) is a front view thereof.
Figure 18B:
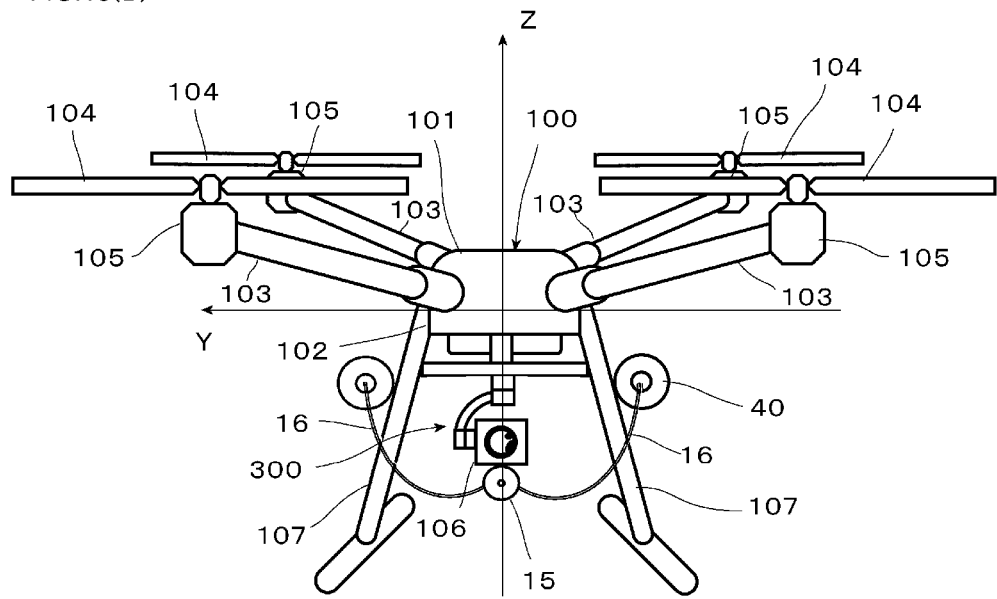

In FIG. 18, 100 denotes an aerial vehicle. The aerial vehicle 100 is an unmanned aircraft such as a so-called multicopter or the like, and an airframe 101 thereof includes an airframe fuselage 102, four arm portions 103 radially extending from the airframe fuselage 102, and leg portions 107 for taking off and landing, wherein four rotor blades 104 are provided at distal ends of the arm portions 103 through motors 105, respectively. In the illustrated example, a quadcopter having four rotor blades 104 is illustrated, but various known multicopters such as those having three rotor blades (tricopter), six rotor blades (hexacopter) or the like are applicable.

In these views, a yaw axis, a roll axis, and a pitch axis of the aerial vehicle 100 are denoted by Z, X, and Y, respectively, wherein in FIG. 17 (A), an upper side of the drawing sheet along the yaw axis Z is defined as an upper side, a left side and a right side of the drawing sheet along the roll axis X are defined as a front side and a rear side, respectively. In addition, in FIG. 18 (A), a left-hand direction and a right-hand direction with respect to the roll axis X when viewed from above are defined as left and right, respectively.

Aerosol container assemblies 40 each having an aerosol container 10 incorporated into a sleeve 20 are mounted on leg portions 107, respectively, which extend downward from the airframe fuselage 102 of the aerial vehicle 100. The aerosol container assemblies 40 are positioned above the lower end portions of the downwardly extending leg portions 107, so that the aerosol container assemblies 40 do not interfere with a landing surface during taking off and landing. A nozzle 15 is attached to the airframe 102 at a location different from the aerosol container assemblies 40, and the aerosol containers 10 therein are connected to the nozzle 15 through tubes 16, and their contents are discharged from the nozzle 15. The aerosol container assemblies 40 with the aerosol containers 10, the tubes 16, and the nozzle 15 are included in a discharge apparatus 1 for an aerial vehicle according to the present embodiment.

In this embodiment, the aerosol container assemblies 40 are mounted on the leg portions 107 which are extension portions extending downward from the airframe fuselage 102. The leg portions 107 are a pair of left and right leg portions which are arranged symmetrically with respect to a roll axis X, and the aerosol container assemblies 40, two in total, are each mounted on each of the left and right leg portions 107, 107. The aerosol container assemblies 40 are each arranged such that a central axis N thereof is parallel to the roll axis X, with the tubes 16 being connected with the front end portion thereof.

On the other hand, the nozzle 15 is arranged at the front end portion of the airframe fuselage 102 where it is suitable for discharging. In this example, a camera 106 is movably mounted on the lower surface of the front end portion of the airframe fuselage 102 through a direction changing device 300, and the nozzle 15 is attached adjacent to the camera 106, so that it moves together with the camera 106 in synchronization therewith. The joint portion described in FIG. 11 (A) of the fourth embodiment of the first solution can be applied to a merging portion of the respective tubes 16 connected to the nozzle 15.

A range adjacent to the camera 106 includes a position in contact with the camera 106 and a region in the vicinity of the camera 106 away from the camera 106 as in the illustrated example, and is a region in which a discharge target position (discharge direction) is at least within the field of view of the camera 106 without changing the attitudes of the nozzle 15 and the camera 106.

The direction changing device 300 is exemplified by a gimbal having degrees of freedom of rotation about the three axes in the illustrated example, but may be any device that changes the imaging or photographing direction by controlling the attitude of the camera. Further, the present invention is not limited to such a configuration as having degrees of freedom of rotation about three axes, but may be configured to have degrees of freedom of rotation about two axes or about one axis. The discharge direction of the nozzle 15 is aligned with the imaging direction of the camera.

For example, the same configuration as that of FIG. 7 of the second embodiment of the first solution can be applied to the direction changing device 300.

The tubes 16 are deformable flexible tubes, and no matter where the nozzle 15 and the aerosol container assemblies 40 are located, the tubes 16 can be deformed to make connections at any position. The tubes 16 does not necessarily have to be flexible over its entire length, but only has to be partially deformable in a portion where the direction changes. In addition, if the arrangement positions of the aerosol container assemblies 40 and the nozzle 15 are determined and the nozzle 15 is not movable but fixed, non-deformable tubes may be arranged in a predetermined layout.

In this way, by mounting the aerosol containers 10 on the outside of the airframe 101, the aerosol containers 10 can be mounted without modifying the inside of the airframe. Moreover, if the nozzle 15 is connected through the tubes 16, the nozzle 15 can be arranged at an optimal position for discharge, regardless of the mounting positions of the aerosol containers 10. Further, as in the present embodiment, by mounting each aerosol container assembly 40 on each leg portion 107 extending from the airframe fuselage 102, it is possible to secure a space for arranging the camera 106 and the direction changing device 300 in the airframe fuselage 102, thereby making it possible to achieve effective use of the space. Furthermore, by arranging the aerosol container assemblies 40 on the left and right leg portions 107, 107, the weights of the left and right sides can be balanced, thereby making it possible to achieve stabilization of the aerial vehicle 100.

This first embodiment is the same as the fourth embodiment of the first solution described above in that the nozzle 15 is attached to the camera 106 supported at the front end portion of the airframe fuselage 102 through the direction changing device 300, and in that the two aerosol container assemblies 40 with thee aerosol containers 10 are mounted on the extension portions extending from the airframe fuselage 102, and in that the tubes 16 from the respective aerosol container assemblies 40 merge into the one nozzle 15, but is different in that the aerosol container assemblies 40 are mounted on the leg portions 107 for taking off and landing, which serve as the extension portions extending from the airframe fuselage 102. This example differs in that the leg portions 107,107 are in two locations, at the left and right sides, and in that the aerosol container assemblies 40, 40 are mounted on the respective leg portions 107, 107.

The description about the configuration of each aerosol container 10, the configuration of each sleeve 20, the support structure of each aerosol container 10, the configuration of each discharge drive unit 30, the configuration of each valve mechanism, another method of each discharge drive unit, electric equipment, and the support structure with the airframe is as described in paragraph 0026 to paragraph 0037 of the first embodiment of the invention of the first solution, and the description thereof will be omitted.

Note that in the illustrated example, the two aerosol container assemblies 40 are mounted, but three or more aerosol container assemblies 40 may be mounted.

[Spraying Operation]

Next, a spraying operation will be described with reference to FIG. 19. FIG. 19 (A) is an explanatory view illustrating a first and a second operation terminal for an aerial vehicle equipped with a discharge apparatus and an example of remote operation of the operation terminal, and FIG. 19 (B) is a simple control block diagram.

For example, as illustrated in FIG. 19, the flight of the aerial vehicle 100 is remotely controlled by the first operation terminal 510, and the discharge apparatus 1 is remotely controlled by a second operation terminal 520. This embodiment is basically the same as the first embodiment of the first solution illustrated in FIG. 5, and only differences will be described. In the example of FIG. 19, a discharge apparatus control unit 410 controls a direction changing device 300 as well as a discharge drive unit 30. Levers 521, 522 of the second operation terminal 520 are levers for remote operation of the direction changing device 300. In the first embodiment of the first solution illustrated in FIG. 5, the camera 106 attached to the airframe 101 is remotely operated, but there is no direction changing device 300 attached to the outside of the airframe, as in the present embodiment. In the present embodiment, the direction changing device 300 is provided, and the imaging direction of the camera 106 is adjusted by operating this direction changing device 300. A nozzle 15 is attached to the camera 106 and moves in unison in synchronization with the camera 106, so that the imaging direction becomes the discharge direction.

In the attitude control of the camera 106, when the levers 521, 522 are operated, a direction change command signal is transmitted, so that it is then received by the discharge apparatus communication unit 412 mounted on the aerial vehicle 100. Based on the direction change command signal thus received, the discharge apparatus control unit 410 drives the direction change device 300 to change the direction of the camera 106.

The operation of switching between discharge and stop of the discharge drive unit 30 by the discharge button 525 and the stop button 526 is the same as that in the first embodiment of the first solution.

Then, another embodiment of the invention of the second solution will be described. In the following description, only differences from the above-mentioned first embodiment will be mainly described, wherein the same components will be denoted by the same reference signs, and the description thereof will be omitted.

Second Embodiment

Figure 20A:
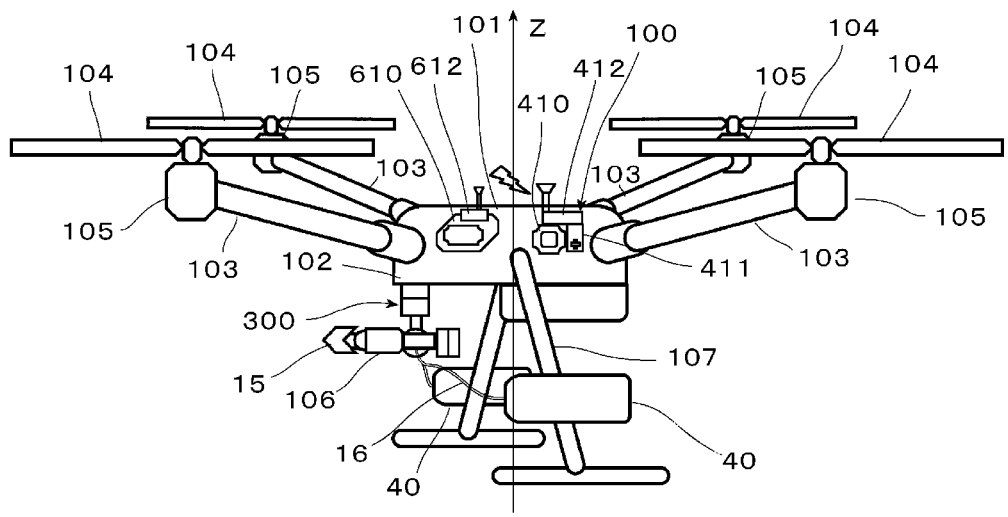
FIG. 20 (A) is an overall configuration view illustrating, as a perspective view, an aerial vehicle in a discharge apparatus for an aerial vehicle according to a second embodiment of the invention of the second solution, and FIG. 20 (B) is a bottom view thereof.
Figure 20B:
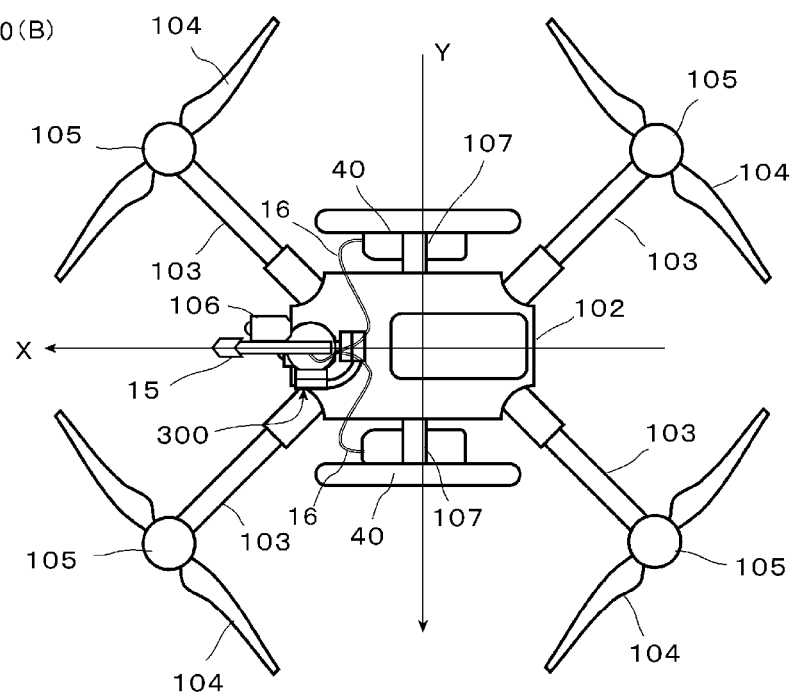
Figure 21A:
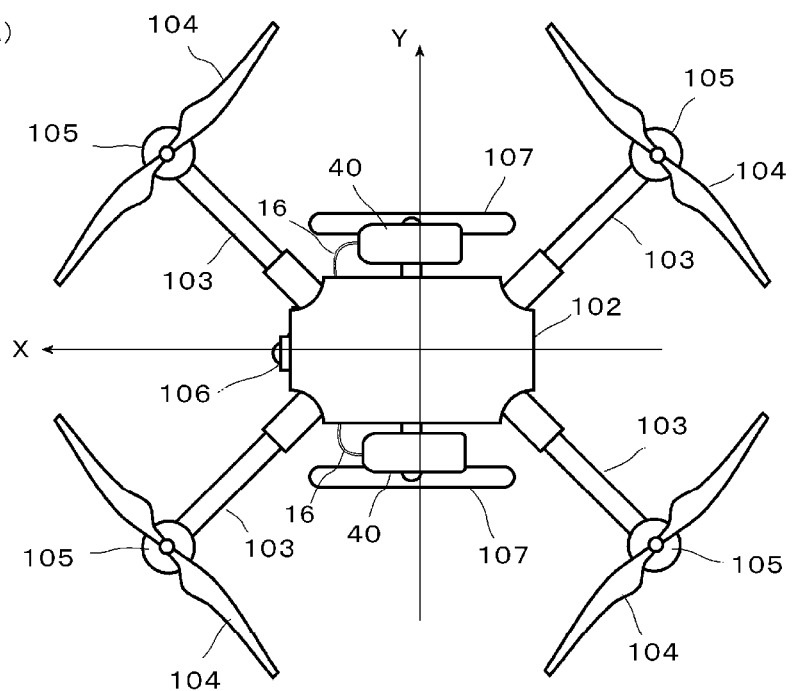
FIG. 21 (A) is a plan view of the apparatus of FIG. 20 (A), and FIG. 21 (B) is a front view thereof.
Figure 21B:
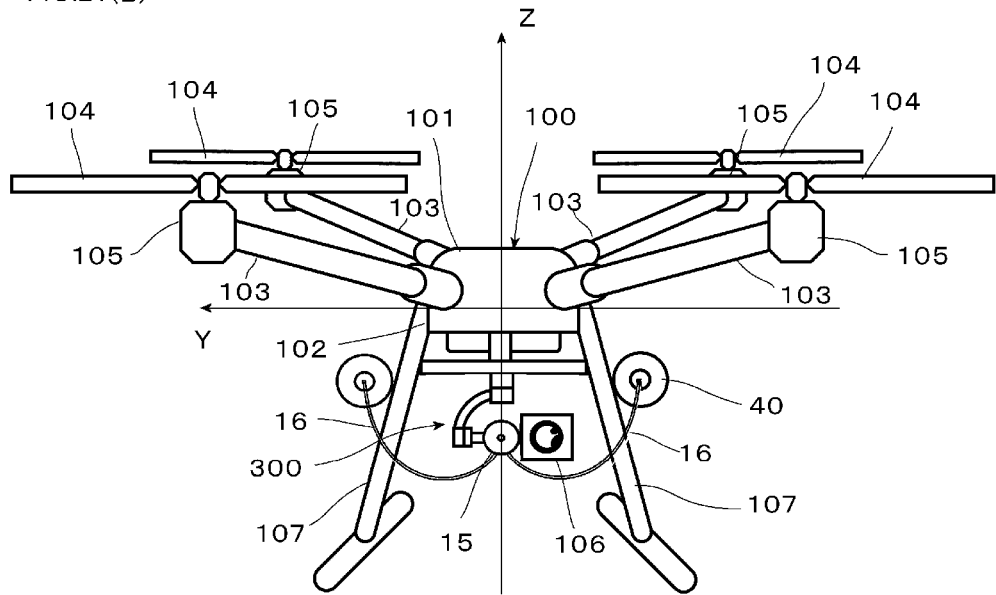

FIGS. 20 and 21 illustrates a discharge apparatus for an aerial vehicle according to a second embodiment of the invention of the second solution, wherein FIG. 20 (A) is an overall configuration view illustrating the aerial vehicle as a perspective view, FIG. 20 (B) is a bottom view thereof, FIG. 21 (A) is a plan view thereof, and FIG. 21 (B) is a view seen from the front.

This second embodiment is the same as the first embodiment in that two aerosol container assemblies 40 each incorporating an aerosol container are mounted on leg portions 107 of an airframe, and in that a nozzle 15 is arranged adjacent to a camera 106 at a front end portion of an airframe fuselage 102, but is different in that the nozzle 15 is supported at the front end portion of the airframe fuselage 102 through a direction changing device 300, and in that the camera is attached to the nozzle 15.

In this way, when the direction of the nozzle 15 is changed, the camera 106 moves in synchronization with the nozzle 15, so that the camera 106 follows the discharge direction of the nozzle 15, and the discharge state can always be visually recognized within the visual field range of the camera 106.

In particular, in this embodiment, in the direction changing device 300 described in FIG. 7 of the above-described first solution, an extension line of a central axis of the nozzle 15 is on the same line as a rotation center of a third rotating body 380, and is arranged so as to pass through an intersection point of an extension line 321 of a rotation center of a first rotating body 320 and an extension line 351 of a rotation center of a second rotating body 350 which are orthogonal to each other.

With this configuration, a reaction force from the nozzle 15 at the time of discharging a content does not act on a first motor 310, a second motor 340, and a third motor 370 as a moment of the discharge reaction force. Therefore, there is an advantage in that there is no possibility that the holding torques of the first motor 310, the second motor 340, and the third motor 370 are defeated due to the moment caused by the discharge reaction force to cause the directions of the nozzle 15 and the camera 106 to swing.

Third Embodiment of Second Solution

Figure 22:
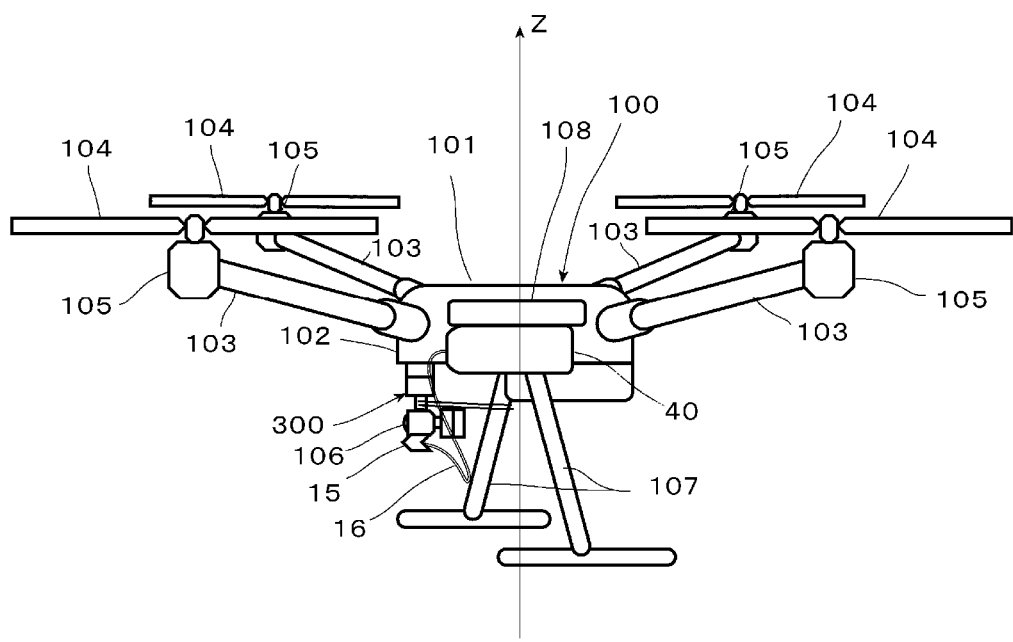
FIG. 22 is an overall configuration view illustrating, as a perspective view, an aerial vehicle in a discharge apparatus for an aerial vehicle according to a third embodiment of the invention of the second solution.
Figure 23A:
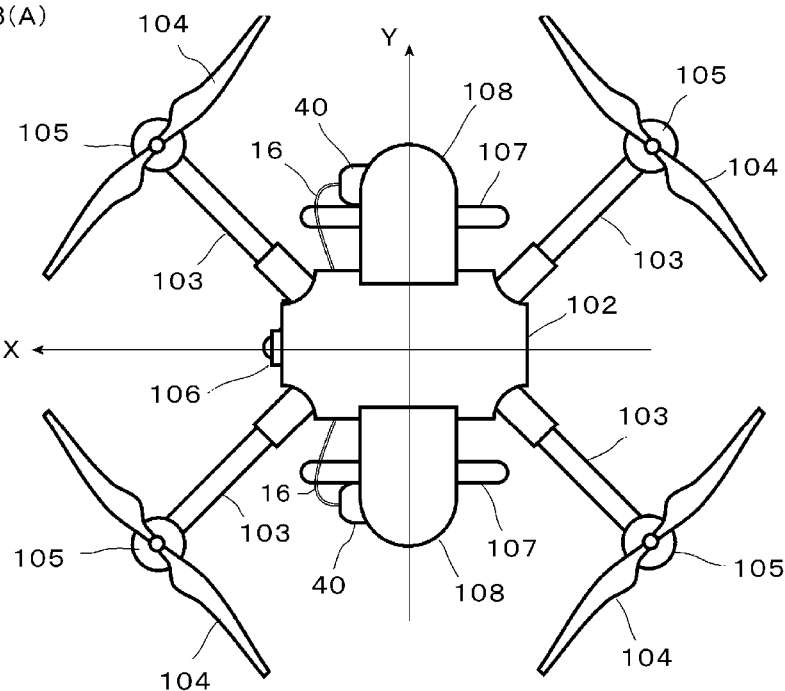
FIG. 23 (A) is a plan view of the apparatus of FIG. 22, and FIG. 23 (B) is a bottom view thereof.
Figure 23B:
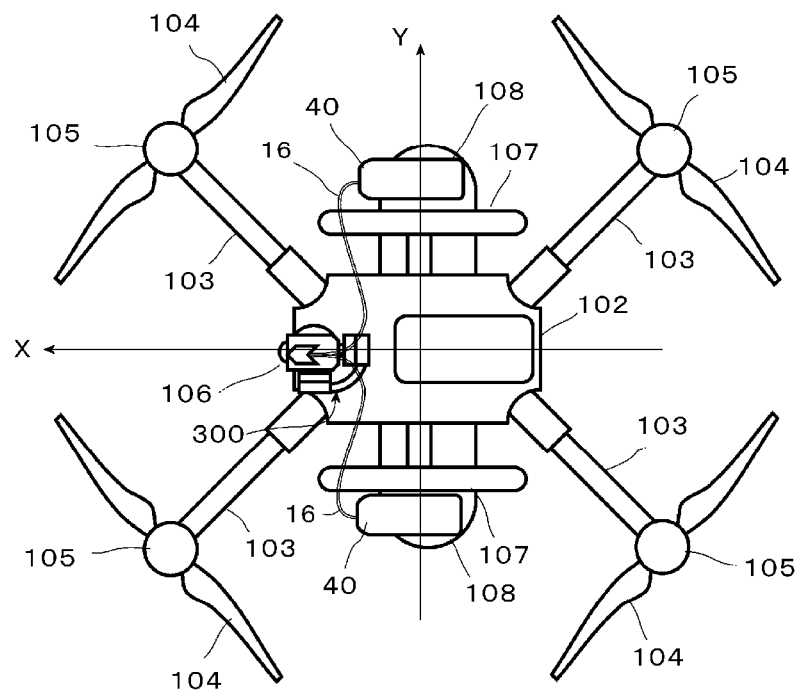
Figure 24:
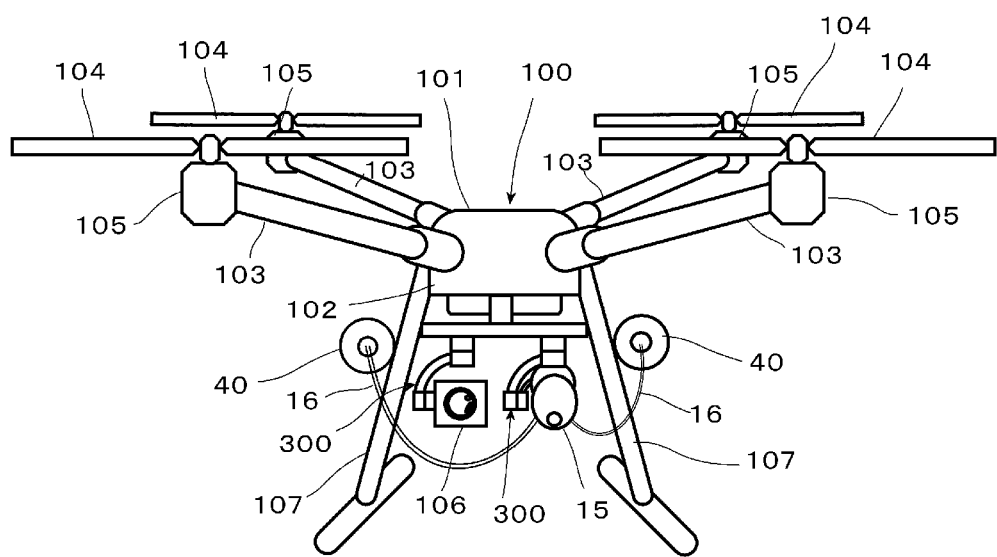
FIG. 24 is a view illustrating a configuration in which a nozzle and a camera are supported with respect to an airframe by separate direction changing devices.

FIGS. 22 and 23 illustrates a discharge apparatus for an aerial vehicle according to a third embodiment of the second solution, wherein FIG. 22 is an overall configuration view illustrating the aerial vehicle as a perspective view, FIG. 23 (A) is a plan view of the apparatus of FIG. 22, and FIG. 23 (B) is a bottom view thereof.

This third embodiment is similar to the second embodiment in that a nozzle 15 is attached to a camera supported on a front end portion of an airframe fuselage 102 through a direction changing device 300, but is different from the second embodiment in that an aerosol container assemblies 40 each including an aerosol container 10 are mounted on small wings 108 which are extension portions extending from the airframe fuselage 102.

The small wings 108 are portions that protrude and extend from the left and right side surfaces of the airframe fuselage 102 in a direction parallel to its pitch axis, wherein in the illustrated example, a total of two aerosol container assemblies 40 are mounted on the lower surfaces of the left and right small wings 108. Then, two tubes 16 connected to the respective aerosol container assemblies 40 merge to be connected to the one nozzle 15.

In this way, only one nozzle 15 is required, and the piping configuration can be simplified.

As described above, in the first through third embodiments of the second solution and the fourth through sixth embodiments of the first solution which are also embodiments of the second solution, there have been described examples in which a plurality of aerosol container assemblies 40 are provided in the leg portions 107, the small wings 108, and the arm portions 103, which are extension portions extending from the airframe fuselage 102, but the plurality of aerosol container assemblies 40 may instead be mounted on the airframe fuselage 102. For example, they can be mounted in various places such as a rear surface, a lower surface, an upper surface, a front surface, a side surface, etc., of the airframe fuselage 102. In addition, in the case of the arrangement of a plurality of aerosol container assemblies, the mounting thereof on the airframe fuselage 102, the small wings 108, the arm portions 103, or the leg portions 107 may be combined with each other as appropriate to form multiple mounting. In this case, too, as described in the first through third embodiments of the second solution and the fourth and sixth embodiments of the first solution which are also embodiments of the second solution, tubes may be merged into one nozzle 15, and as described in the fifth embodiment of the first solution which is also an embodiment of the second solution, a plurality of nozzles 15 can be collectively arranged at a position adjacent to a camera 106.

In addition, in the above-mentioned first embodiment, an example is illustrated in which the nozzle 15 is held by the camera 106 supported by the direction changing device 300, and in the second embodiment, the camera 106 is held by the nozzle 15 that is supported by the direction changing device 300, but as illustrated in FIG. 17, the camera 106 and the nozzle 15 may be supported by different direction changing devices 300, respectively.

In this way, if the direction changing device 300 for the nozzle 15 is provided separately from the direction changing device 300 for the camera 106, it is possible to move the nozzle 15 in synchronization with the camera 106, as well as to control the direction of the nozzle 15 without synchronizing the nozzle 15 with the camera 106.

Here, note that in the above-mentioned embodiments of the first solution and the second solution, each aerosol container is stored in each sleeve and mounted on the aerial vehicle, but it is not always necessary to mount an aerosol container on the aerial vehicle by storing the aerosol container in a sleeve, and for example, an aerosol container may be mounted on the aerial vehicle by a gripping means for gripping its body portion.

In addition, in each of the above-described embodiments, an example has been described in which a multicopter is used as an aerial vehicle on which a liquid material discharge apparatus is mounted, but a discharge apparatus for a moving vehicle of the present invention can be applied to not only a helicopter but also an unmanned aircraft such as a fixed-wing aircraft, an airship, a gliding aircraft, etc., in addition to an aerial vehicle using rotor blades (rotors), and can also be applied to not only an unmanned but also a manned aircraft.

Invention of Third Solution

Next, the invention of the third solution will be described in detail based on embodiments illustrated in the drawings.

The dimensions, materials, shapes, relative arrangements, etc., of the components described in the following embodiments should be changed as appropriate depending on the configuration and various conditions of an apparatus to which the invention is applied, and are not intended to limit the scope of the invention to the following embodiments. Here, note that a camera-equipped discharge apparatus according to the present invention is used for discharging fluid such as liquid or gas from a moving vehicle by using an aerosol container. In addition, it can also be used for the purpose of generating sound (horn) by using the discharge of fluid. Examples of the moving vehicle include an unmanned aerial vehicle, an unmanned vehicle, and an unmanned ship. Also, examples of the aerial vehicle include an aircraft (a multicopter or a helicopter) having rotor blades (rotors), a fixed-wing aircraft, an airship, and a gliding aircraft. The camera-equipped discharge apparatus according to the present embodiment can be suitably applied to an unmanned moving vehicle, but can also be applied to a manned moving vehicle. In the following embodiments, an unmanned aircraft (multicopter) will be described as an example of a moving vehicle that is provided with a camera-equipped discharge apparatus.

In the invention of the third solution, a nozzle and a camera are arranged so as to be operated in unison by a common direction changing device.

Although the second through sixth embodiments of the above-mentioned first solution have been described as embodiments of the invention of the first solution, they also correspond to embodiments of the invention of the third solution. Moreover, although the first through third embodiments of the second solution have been described as embodiments of the invention of the second solution, they also correspond to embodiments of the invention of the third solution. In the following description, embodiments other than the second through sixth embodiments of the above-mentioned first solution and the first through third embodiments of the second solution will be described.

First Embodiment of Third Solution

Figure 25:
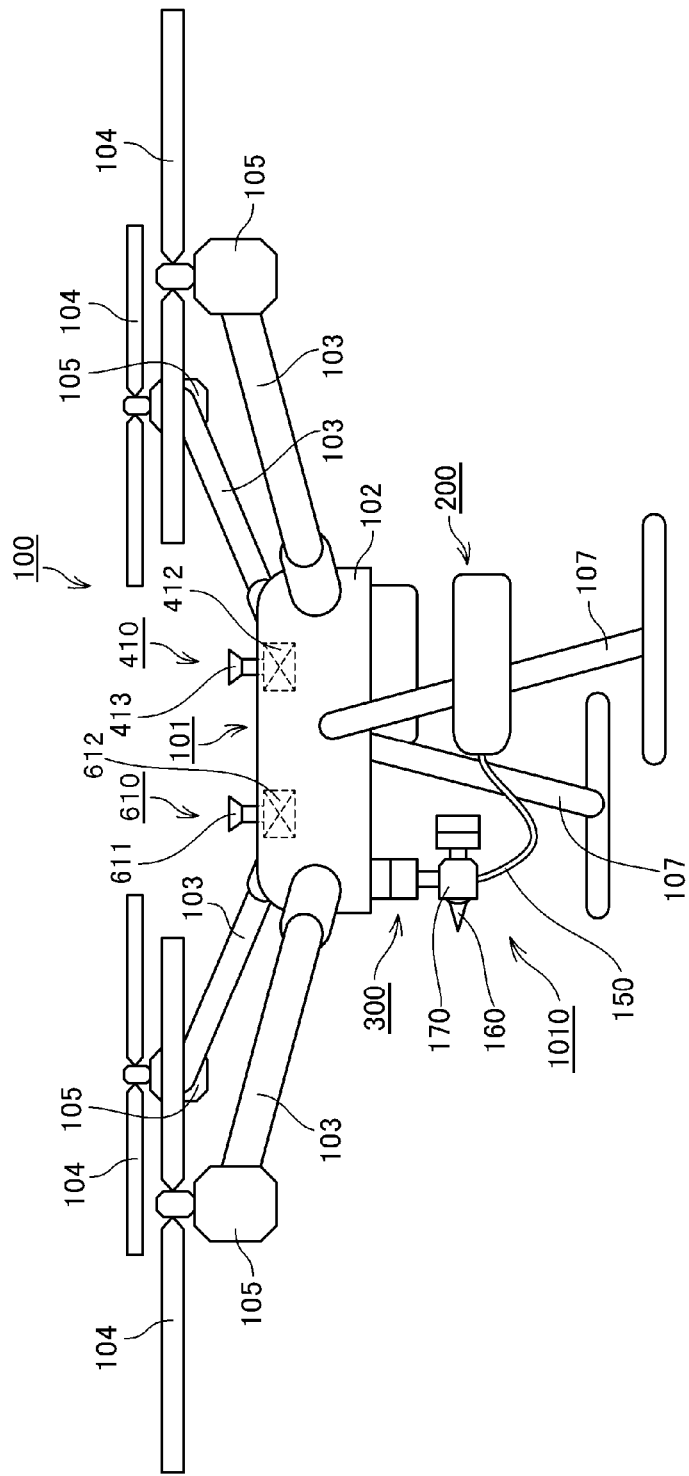
FIG. 25 is an external view of an aerial vehicle (unmanned aircraft) with a camera-equipped discharge apparatus according to a first embodiment of an invention of a third solution.
Figure 26:
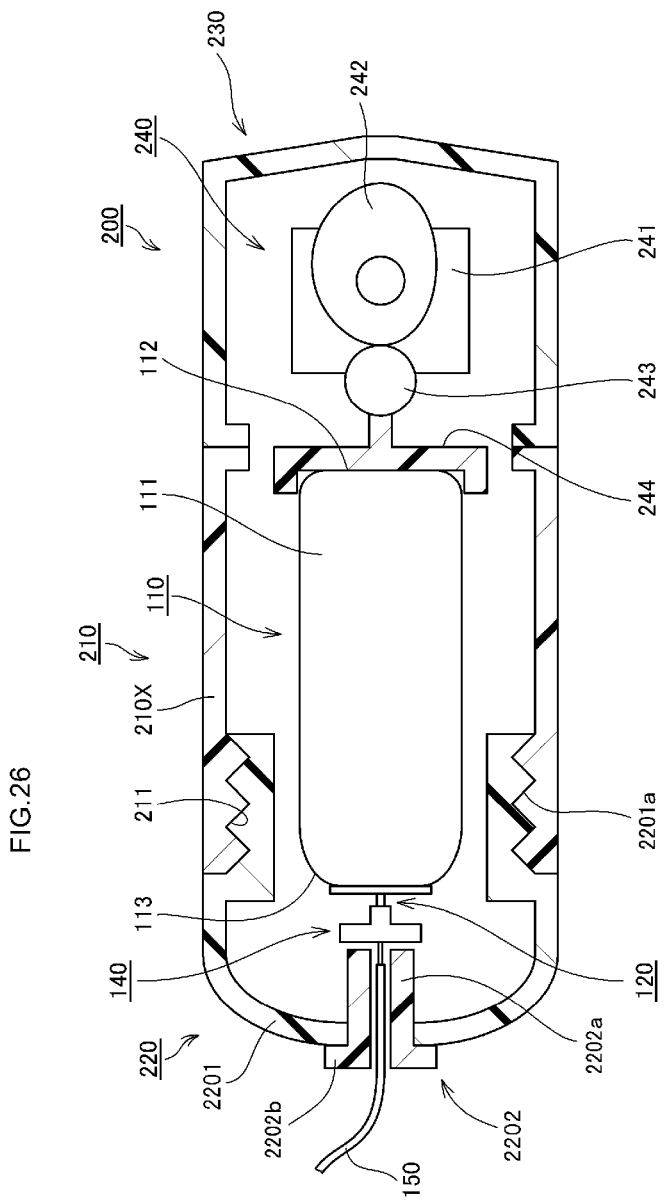
FIG. 26 is a schematic cross-sectional view of a discharge apparatus according to an embodiment of the invention of the third solution.
Figure 27:
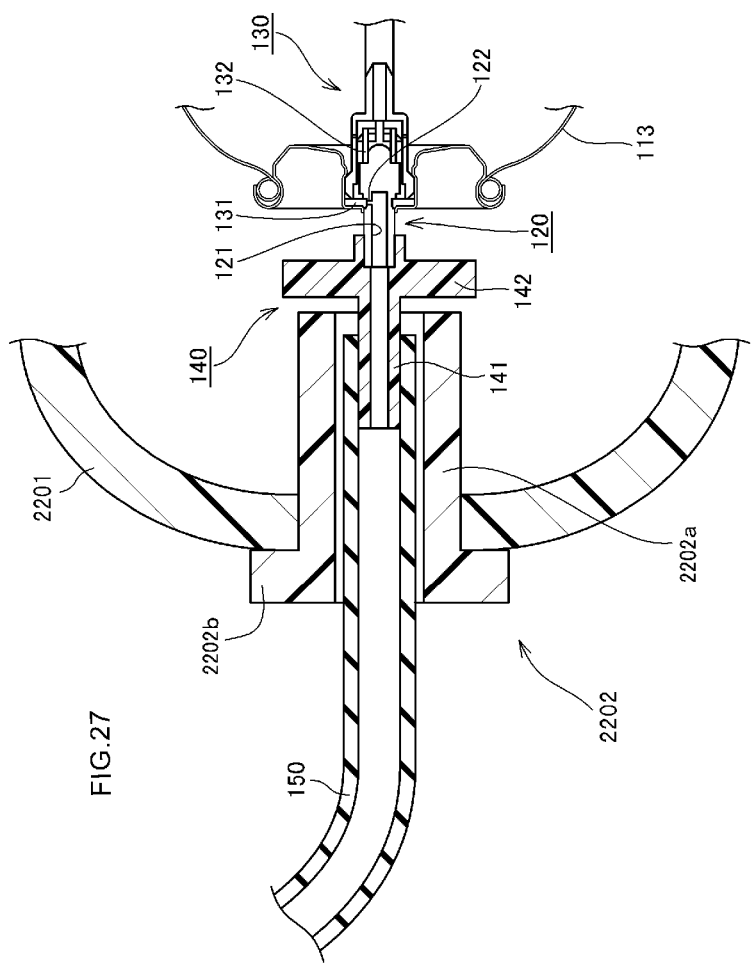
FIG. 27 is an enlarged cross-sectional view illustrating an example of a valve structure of an aerosol container of FIG. 26.
Figure 28:
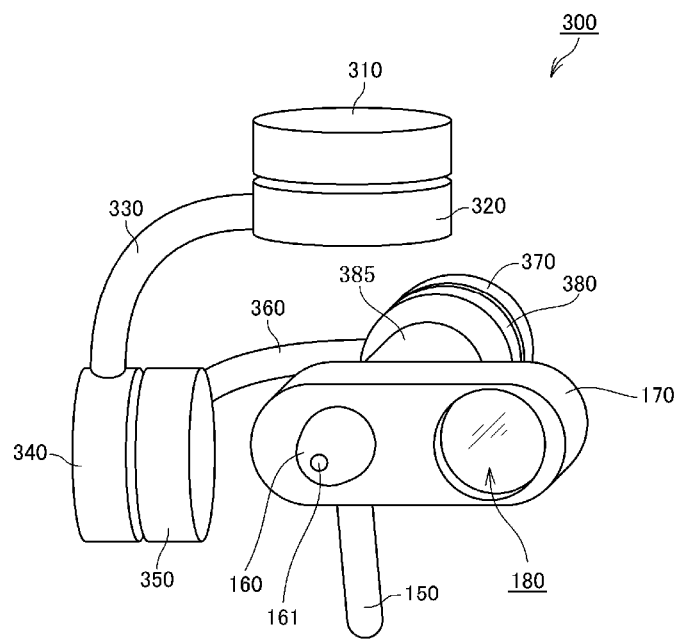
FIG. 28 is a perspective view illustrating a state in which a main component of the camera-equipped discharge apparatus according to the first embodiment of the invention of the third solution is attached to a direction changing device.
Figure 29:
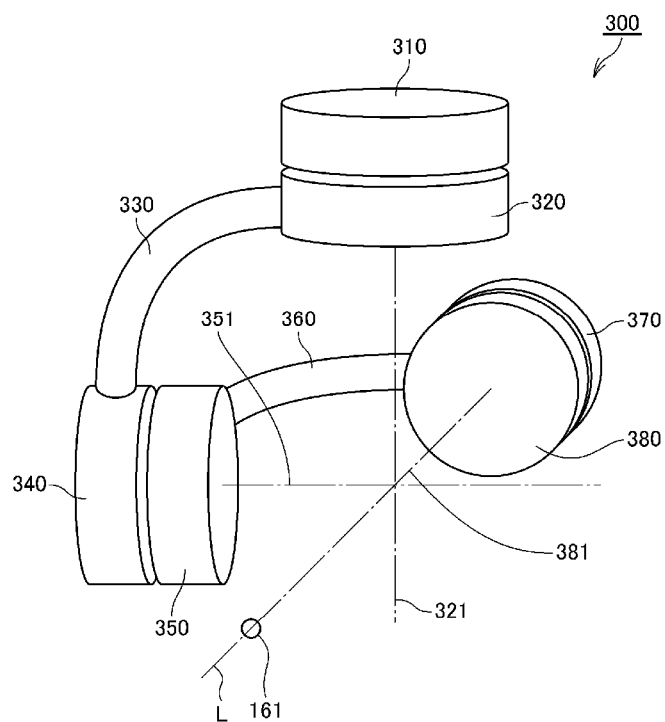
FIG. 29 is a perspective view of the direction changing device according to the first embodiment of the invention of the third solution.
Figure 30:
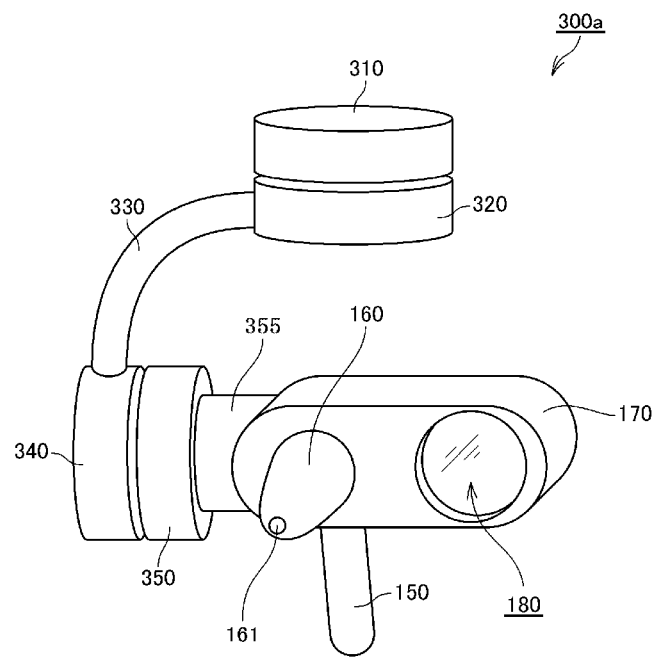
FIG. 30 is a perspective view illustrating a state in which the main component of the camera-equipped discharge apparatus according to the first embodiment of the invention of the third solution is attached to a direction changing device according to a first modification.
Figure 31:
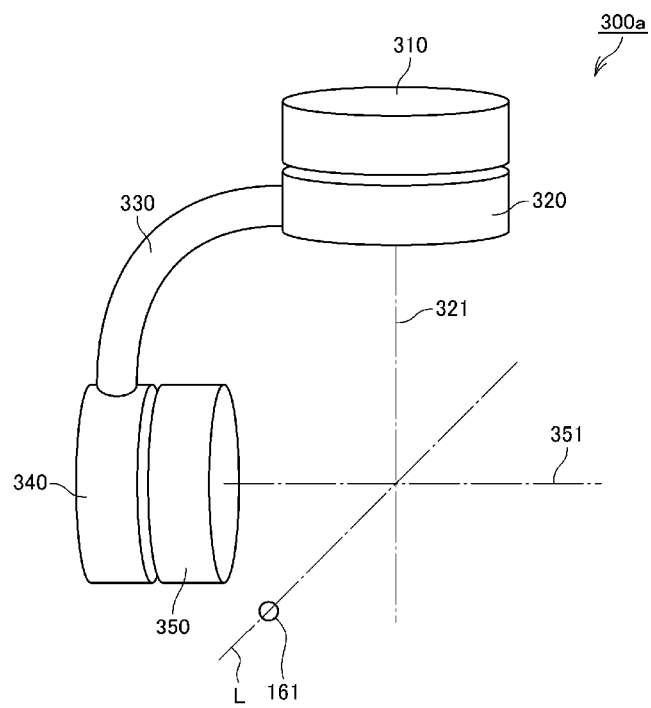
FIG. 31 is a perspective view of the direction changing device according to the first modification of the invention of the third solution.
Figure 32:
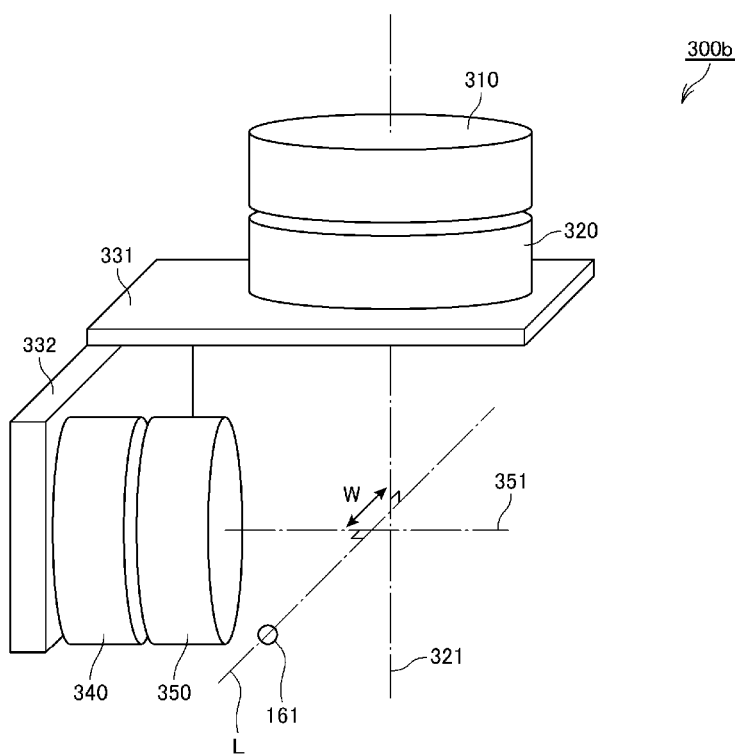
FIG. 32 is a perspective view of a direction changing device according to a second modification of the invention of the third solution.
Figure 33:
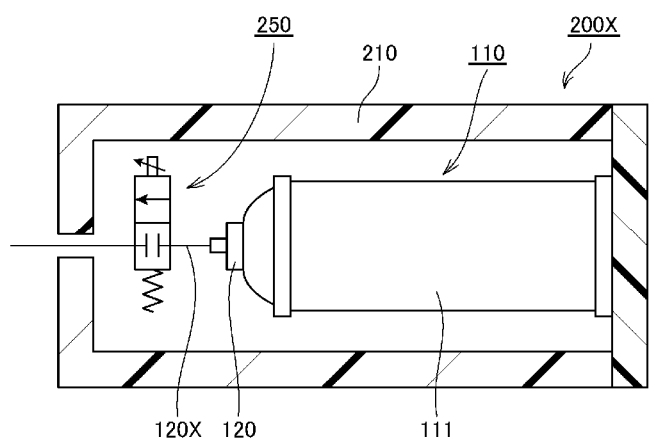
FIG. 33 is a schematic cross-sectional view of a discharge apparatus according to a modification of the invention of the third solution.
Figure 34:
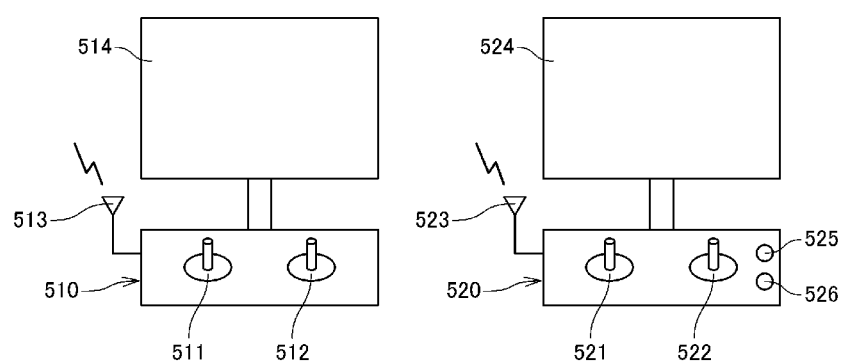
FIG. 34 is a schematic view of an operation device for an aerial vehicle with a camera-equipped discharge apparatus.

A camera-equipped discharge apparatus according to a first embodiment of the invention of the third solution will be described with reference to FIGS. 25 through 34. FIG. 25 is an external view of an aerial vehicle (unmanned aircraft) provided with a camera-equipped discharge apparatus according to the first embodiment of the present invention, and illustrates an external view of the aerial vehicle as seen from a lateral side. FIG. 26 is a schematic cross-sectional view of a discharge apparatus main body according to an embodiment of the present invention. FIG. 27 is an enlarged cross-sectional view illustrating an example of a valve configuration of the aerosol container of FIG. 2, and is an enlarged cross-sectional view illustrating the vicinity of an injection portion of the aerosol container. FIG. 28 is a perspective view illustrating a state in which a main component of the camera-equipped discharge apparatus according to the first embodiment of the present invention is attached to a direction changing device. FIG. 29 is a perspective view of the direction changing device according to the first embodiment of the present invention. FIG. 30 is a perspective view illustrating a state in which the main component of the camera-equipped discharge apparatus according to the first embodiment of the present invention is attached to a direction changing device according to a first modification. FIG. 31 is a perspective view of the direction changing device according to the first modification of the present invention. FIG. 32 is a perspective view of a direction changing device according to a second modification of the present invention. FIG. 33 is a schematic cross-sectional view of a discharge apparatus main body according to a modification of the present invention. FIG. 34 is a schematic view of an operation device for the aerial vehicle provided with the camera-equipped discharge apparatus.

<Aerial Vehicle (Multicopter)>

In particular, with reference to FIG. 25, an overall configuration of an unmanned aircraft (multicopter) provided with a discharge apparatus according to the present embodiment will be described. In the present embodiment, a camera-equipped discharge apparatus 1010 is provided in an aerial vehicle 100, which is an unmanned aircraft. An airframe 101 of the aerial vehicle 100 includes an airframe fuselage 102, four arm portions 103 extending radially from the airframe fuselage 102, and two leg portions 107 for taking off and landing. Rotor blades 104 are provided at the distal ends of the arm portions 103 through motors 105, respectively. In the illustrated example, a quadcopter having four rotor blades 104 is shown, but various known multicopters such as a tricopter having three rotor blades and a hexacopter having six rotor blades may be employed. A yaw axis, a roll axis, and a pitch axis of the airframe 101 are a vertical direction, a left-right direction, and a front-back direction, respectively, on the drawing sheet. Further, an upper side of the drawing sheet is an upper side of the airframe 101, and a left side of the drawing sheet is a front side of the airframe 101.

Then, a discharge apparatus main body 200 is attached to a leg portion 107. The discharge device main body 200 according to the present embodiment is configured to be replaceable as a whole. In addition, it is also possible to replace only an aerosol container therein. The discharge apparatus main body 200 is provided with a mechanism for discharging (injecting) the content in the aerosol container provided therein. In the present embodiment, the discharge apparatus main body 200 is attached to a leg portion 107, but it is not limited to attachment to a leg portion 107, and can be configured to be attached to the airframe fuselage 102 or an arm portion 103.

In addition, a direction changing device 300 is provided on the lower surface of the airframe fuselage 102. As a specific example of the direction changing device 1300, a gimbal can be mentioned. Then, the direction changing device 300 is provided with a holding member 170 that holds a nozzle 160 and the like. The nozzle 160 is attached to a distal end of a connection tube 150 that is connected to the aerosol container in the discharge apparatus main body 200. The discharge apparatus main body 200 corresponds to an aerosol container assembly of each embodiment of the first solution and the second solution, and is also referred to as an aerosol container assembly. This discharge apparatus main body 200 provided with an aerosol container 10, the connection tube 150, the nozzle 160, and the holding member 170 that holds the nozzle 160 and a camera to be described later are included in the camera-equipped discharge apparatus 1010.

<Discharge Apparatus Main Body>

In particular, the discharge apparatus main body 200 according to the present embodiment will be described with reference to FIGS. 26 and 27. The discharge apparatus main body 200 includes a frame body 210 having a hollow inside. The frame body 210 corresponds to the housing member and the sleeve 20 of the first solution and the second solution. The frame body 210 is composed of a cylindrical frame main body portion 210X, a first cover 220 that covers one end portion of the frame main body portion 210X, and a second cover 230 that is provided at the other end thereof. For materials for the frame body portion 210X, the first cover 220, and the second cover 230, there may be adopted metals such as aluminum, plastics, or lightweight materials with high strength such as carbon fibers. In addition, the materials are not limited to hard materials, but soft materials, for example, rubber materials such as silicone rubber or urethane foam may be adopted. In short, various materials capable of maintaining the shape of the housing portion for housing 0 can be used.

The first cover portion 220 is configured to be attachable to and detachable from the frame main body portion 210X by screwing a male threaded portion 2201*a* provided at an end portion of the first cover portion 110 into a female threaded portion 211 provided in the frame main body portion 210X. The second cover portion 230 according to the present embodiment is composed of a bottomed cylindrical member, and is fixed to the frame main body portion 210X. The frame main body portion 210X and the second cover portion 230 may be integrally formed. The first cover portion 220 is composed of a dome-shaped cover main body 2201 having a through-hole formed at a distal end thereof, and a cylindrical portion having the male threaded portion 2201*a* described above. The cover main body 2201 has a conical shape with a rounded tip or a dome-shaped curved surface whose diameter is gradually reduced toward its tip in consideration of aerodynamic characteristics. With such a shape having good aerodynamic characteristics, the influence of horizontal wind (crosswind) is reduced, and the flight of the aerial vehicle 100 can be stabilized. Further, a drive mechanism 240 for discharging (injecting) the content of the aerosol container 110 is provided inside the second cover portion 230 positioned on the bottom side of the aerosol container 110.

The aerosol container 110 provided in the discharge apparatus main body 200 has a container body 111 which is supported at its bottom portion 112 by a bottom portion support member 244 provided in the drive mechanism 240, and which is supported at its head portion side by a pressing member 2202 provided in the first cover portion 220. The pressing member 2202 includes a tubular portion 2202*a* protruding from a top portion of the first cover portion 220 toward a stem 120 in the central axis direction of the aerosol container 110, and an end flange portion 2202*b* provided at one end of the tubular portion 2202*a* and fixed to the first cover portion 220. As illustrated in FIG. 27, the connection tube 150, which connects a tubular portion 141 of an actuator 140 and the nozzle 160, is inserted into a tube of the tubular portion 2202*a* of the pressing member 2202 so as to be slidable in the axial direction. In addition, a distal end surface of the tubular portion 2202*a* of the pressing member 2202 is in contact with or close to the flange portion 142 of the actuator 140. Here, note that the pressing member 2202 may be formed integrally with the first cover portion 220.

The drive mechanism 240 is fixed to the second cover portion 230, and the aerosol container 110 is movable in the axial direction. The drive mechanism 240 plays a role of controlling discharge and stop of the content by moving the aerosol container 110 in the axial direction.

The drive mechanism 240 includes a motor 241 that serves as a rotary drive source, a cam 242 that is configured to be rotatable by the motor 241, and a cam follower 243 that moves along a cam surface of the cam 242. The cam follower 243 is fixed to the bottom support member 244 that supports the bottom portion 112 of the container body 111. The cam 242 in the illustrated example is an oval disc cam, wherein a cam axis of the cam 242 is orthogonal to a central axis of the aerosol container 110, so that the rotation of the cam 242 is converted into linear motion of the bottom support member 244 via the cam follower 243. Here, note that in order to bring the cam follower 243 into contact with the cam 242 at all times, the bottom support member 244 is urged toward the cam 242 side by an unillustrated urging means (such as a spring or the like).

Normally, the cam 242 is in contact at a smallest diameter portion thereof with the cam follower 243, wherein the bottom support member 244 is at its retracted limit position, and the valve mechanism 130 of the aerosol container 110 is held in a closed state. When the cam 242 is rotated by the motor 241, the bottom support member 244 moves forward in the axial direction (leftward in FIG. 2). That is, the contact position of the cam 242, with which the cam follower 243 comes into contact at the retracted limit position, has a small diameter from the rotation center thereof, and the contact position of the cam 242, with which the cam follower 243 comes into contact at the forward limit position, has a large diameter from the rotation center thereof. In the illustrated example, the valve mechanism is opened not at the largest diameter portion of the cam 242 but at a transition portion from the smallest diameter portion to the largest diameter portion, but the valve mechanism may be opened at the largest diameter portion.

As the bottom support member 244 moves forward, the aerosol container 110 also moves forward, so that the actuator 140 are pressed against the tip of the tubular portion 2202a of the pressing member 2202. Since the pressing member 2202 is fixed to the first cover portion 220, the stem 120 is pushed into the aerosol container 110 by a reaction force from the tubular portion 2202a, so that the valve mechanism 130 in the aerosol container 110 is opened. When the valve mechanism 130 is opened, the content is automatically discharged by the gas pressure.

<Aerosol Container>

In particular, the aerosol container 110 will be described in more detail with reference to FIGS. 26 and 27. The aerosol container 110 is a container that discharges its content by gas pressure of liquefied gas or compressed gas filled therein, and an existing aerosol container made of metal can be applied, or a container made of plastic having pressure resistance can be used. In the aerosol container 110, various actuators in which a flow passage is formed according to a discharge direction or a discharge form can be mounted on the stem 120. In the illustrated example, the actuator 140 having the flange portion 142 is attached to the stem 120 of the aerosol container 110. The actuator 140 is configured to include the linear tubular portion 141 having a straight discharge flow passage, and the flange portion 142 protruding from the tubular portion 141 in a direction perpendicular to the axis thereof. The connection tube 150 is connected to the tubular portion 141 of the actuator 140. In addition, the nozzle 160 having a discharge port 161 is connected to the distal end of the connection tube 150 (see FIG. 28). The configuration of the discharge port 161 of the nozzle 160 can be appropriately set depending on whether the content is discharged in a mist form or as a linear jet flow, or depending on the discharge form and discharge direction of the content.

In the illustrated example, the aerosol container 110 is used by being horizontally mounted on the lower surface of the airframe 101, and hence, as the form of the propellant and the content to be sealed, an isolation type is used in which a stock solution is accommodated in an inner bag and the propellant is accommodated between the outer periphery of the inner bag and the inner periphery of a container main body. In the case of the isolated type, discharge can be made from the aerosol container even when the aerosol container 11 is in a horizontal direction (the stem is positioned horizontally) or a downward direction (the stem is positioned downward).

However, the form of the propellant and the content to be sealed is not limited to the isolated type, but a two-phase type or three-phase type container with a dip tube can be applied in cases where the attitude of the aerosol container 110 at the time of discharge is used with the stem 12 facing upward, and a two-phase type or three-phase type container having no dip tube can be applied in cases where the attitude of the aerosol container 11 is used with the stem 12 facing downward.

Here, note that as the propellant, there can be applied liquefied gases such as general hydrocarbons (liquefied petroleum gas) (LPG), dimethyl ether (DME), fluorinated hydrocarbons (HFO-1234ZE), etc., as well as compressed gases such as carbon dioxide, nitrogen, nitrous oxide, etc. Non-flammable fluorinated hydrocarbons, carbon dioxide, nitrogen, nitrous oxide and the like are preferable in consideration of safety against fire, and nitrogen is particularly preferable in consideration of environmental load.

<Valve Mechanism of Aerosol Container>

In particular, with reference to FIG. 27, the valve mechanism 130 of the aerosol container will be described in which opening and closing of a valve is performed by the drive mechanism 240. That is, the stem 120 is provided with a discharge flow passage 121 extending by a predetermined length in the axial direction from its tip opening portion, and a stem hole 122 serving as a valve hole is opened in a side surface of the stem 120, wherein this stem hole 122 is sealed by an inner peripheral surface of a gasket 131 mounted on a hole edge of an insertion hole in a mounting cup 113.

Normally, the stem 120 is urged in a protruding direction by the gas pressure and the urging force of the spring 132, and an inner peripheral edge of the gasket 131, which serves as a valve body, is pressed in the axial direction, so that the inner peripheral surface of the gasket 131 comes into close contact with the hole edge of the stem hole 122, which constitutes a valve seat, thereby maintaining a valve closed state.

When the bottom support member 244 is moved to the forward limit position by the cam 242 of the drive mechanism 240 described above, the aerosol container 110 is moved toward the first cover portion 220, so that the flange portion 142 of the actuator 140 is brought into contact with the end surface of the pressing member 2202, and the stem 120 is relatively pushed toward the inside of the container by the reaction force. When the stem 120 is pushed in, the inner peripheral edge of the gasket 131 is bent or flexed toward the inside of the container, so that the inner peripheral surface of the gasket 131 is moved away from the hole edge of the stem hole 122 to open the valve mechanism, whereby the content pushed by the gas pressure is discharged (injected) from the discharge flow passage 121 in the stem 120.

The valve mechanism 130 in the illustrated example is an example, and is not limited to such a configuration, but various configurations can be applied in which the valve mechanism is normally maintained in a closed state, and is opened by pushing in the stem 120.

In this example, the rotational motion of the shaft of the motor 241 is converted into linear motion by the cam mechanism, but in the present invention, a mechanism for opening and closing the valve of the aerosol container is not limited to the cam mechanism. For example, a mechanism that converts rotational motion of the shaft of the motor into linear motion by a screw feed mechanism, a rack and pinion or the like can be applied. In addition, instead of the rotary motor, a linear drive source such as a linear motor for linear drive, an electromagnetic solenoid or the like may be used to move the aerosol container 110 in the axial direction without using a motion conversion mechanism.

<Direction Changing Device>

In particular, the direction changing device 300 according to the present embodiment will be described with reference to FIGS. 28 and 29. In the present embodiment, the holding member 170, which holds the nozzle 160 and the camera 180, is attached to the direction changing device 300. As described above, the nozzle 160 is attached to the distal end of the connection tube 150 connected to the aerosol container 110. In addition, the main body portion of the camera 180 is arranged inside the holding member 170, and is configured such that only a lens thereof is exposed (see FIG. 28). The camera 180 is arranged at a position where a discharge state of the content to be discharged from the nozzle 160 can be photographed. Moreover, the nozzle 160 is arranged so as not to enter the photographing or imaging range of the camera 180. With the above-described configuration, the direction of the holding member 170 is changed by the direction changing device 300, so that the nozzle 160 and the camera 180 are operated in unison (the directions thereof are changed in unison).

Now, in particular, with reference to FIG. 28, the mechanism of the direction changing device 300 itself will be described. The direction changing device 300 includes a first motor 310, a first rotating body 320 that is rotated by the driving force of the first motor 310, a second motor 340 that turns in accordance with the rotation of the first rotating body 320, and a second rotating body 350 that is rotated by the driving force of the second motor 340. The first rotating body 320 and the second motor 340 are connected with each other by means of a first arm 330. The direction changing device 300 further includes a third motor 370 that turns in accordance with the rotation of the second rotating body 350, and a third rotating body 380 that is rotated by the driving force of the third motor 370. The second rotating body 350 and the third motor 370 are connected with each other by means of a second arm 360. Then, the holding member 170 is fixed to the third rotating body 380 through a coupling portion 385. Thus, the direction of the nozzle 160 held by the holding member 170 is changed in accordance with the operation of the third rotating body 380.

Thus, the direction changing device 300 includes at least one rotating body (in the present embodiment, the first rotating body 320, the second rotating body 350, and the third rotating body 380) that rotatably or pivotally supports the nozzle 160 such that the direction of the nozzle 160 can be changed. Then, the nozzle 160 held by the holding member 170 is designed such that an extension line L of the center line of the discharge port 161 of the nozzle 160 intersects with extension lines of the rotation center lines of all the rotating bodies. In the present embodiment, an extension line 321 of the rotation center line of the first rotating body 320, an extension line 351 of the rotation center line of the second rotating body 350, and an extension line 381 of the rotation center line of the third rotating body 380 are orthogonal to each other. Then, the extension line L of the center line of the discharge port 161 of the nozzle 160 is designed to coincide with the extension line 381 of the rotation center line of the third rotating body 380. Therefore, the extension line L intersects with the extension line 321 and the extension line 351 so as to be orthogonal to each other, and intersects with the extension line 381 so as to be coincident with each other.

According to the above configuration, even if a reaction force is generated when the content of the aerosol container 110 is discharged from the discharge port 161 of the nozzle 160, the reaction force does not act as a torque for rotating each of the rotating bodies (the first rotating body 320, the second rotating body 350, and the third rotating body 380).

<First Modification of Direction Changing Device>

A direction changing device 300a according to a first modification will be described with reference to FIGS. 30 and 31. In this modification, a holding member 170, which holds a nozzle 160 and a camera 180, is attached to the direction changing device 300a. Since the configurations of the nozzle 160 and the camera 180 are as described above, the description thereof will be omitted.

The direction changing device 300a according to the present modification includes a first motor 310, a first rotating body 320 that is rotated by the driving force of the first motor 310, a second motor 340 that turns in accordance with the rotation of the first rotating body 320, and a second rotating body 350 that is rotated by the driving force of the second motor 340. The first rotating body 320 and the second motor 340 are connected with each other by means of a first arm 330. Then, the holding member 170 is fixed to the second rotating body 350 through a coupling portion 355. As a result, the direction of the nozzle 160 held by the holding member 170 is changed in accordance with the operation of the second rotating body 350.

Thus, the direction changing device 300a according to the present modification also includes at least one rotating body (in the present modification, the first rotating body 320 and the second rotating body 350) that rotatably or pivotally supports the nozzle 160 such that the direction of the nozzle 160 can be changed. Then, the nozzle 160 held by the holding member 170 is designed such that an extension line L of the center line of a discharge port 161 of the nozzle 160 intersects with extension lines of the rotation center lines of all the rotating bodies. In the present modification, an extension line 321 of the rotation center line of the first rotating body 320 and an extension line 351 of the rotation center line of the second rotating body 350 are configured to be orthogonal to each other. Then, the extension line L of the center line of the discharge port 161 of the nozzle 160 intersects with the extension line 321 and the extension line 351 so as to be orthogonal to each other.

According to the above configuration, even if a reaction force is generated when the content of the aerosol container 110 is discharged from the discharge port 161 of the nozzle 160, the reaction force does not act as a torque for rotating each of the rotating bodies (the first rotating body 320 and the second rotating body 350).

<Second Modification of Direction Changing Device>

A direction changing device 300b according to a second modification will be described with reference to FIG. 32. In this modification, too, a holding member 170, which holds a nozzle 160 and a camera 180, is attached to the direction changing device 300b (in FIG. 32, only a discharge port 161 of the nozzle 160 is illustrated). Since the configurations of the nozzle 160 and the camera 180 are as described above, the description thereof will be omitted.

The direction changing device 300b according to the present modification includes a first motor 310, a first rotating body 320 that is rotated by the driving force of the first motor 310, a second motor 340 that turns in accordance with the rotation of the first rotating body 320, and a second rotating body 350 that is rotated by the driving force of the second motor 340. The first rotating body 320 and the second motor 340 are connected with each other by means of two plate-like members 331, 332. Then, the above-mentioned holding member 170 (not shown) is fixed to the second rotating body 350. As a result, the direction of the nozzle 160 held by the holding member 170 is changed in accordance with the operation of the second rotating body 350.

Thus, the direction changing device 300b according to the present modification also includes at least one rotating body (in the present modification, the first rotating body 320 and the second rotating body 350) that rotatably or pivotally supports the nozzle 160 such that the direction of the nozzle 160 can be changed. Then, the nozzle 160 held by the holding member 170 is designed such that an extension line L of the center line of the discharge port 161 of the nozzle 160 intersects with extension lines of the rotation center lines of all the rotating bodies. In the present modification, an extension line 321 of the rotation center line of the first rotating body 320 and an extension line 351 of the rotation center line of the second rotating body 350 are separated from each other by a distance W and do not intersect each other. Then, the extension line L of the center line of the discharge port 161 of the nozzle 160 intersects with the extension line 321 and the extension line 351 so as to be orthogonal to each other.

According to the above configuration, even if a reaction force is generated when the content of the aerosol container 110 is discharged from the discharge port 161 of the nozzle 160, the reaction force does not act as a torque for rotating each of the rotating bodies (the first rotating body 320 and the second rotating body 350).

Other Examples of Direction Changing Device

In the examples of the direction changing device thus far described, cases where three rotating bodies are provided and cases where two rotating bodies are provided have been described. However, in the present invention, the number of rotating bodies is not limited as long as there is at least one rotating body. For example, it is also possible to adopt a configuration in which a direction changing device including only a first motor 310 and a first rotating body 320, which is rotated by the driving force of the first motor 310, as illustrated in each of the above examples, is used, with a holding member 170 being fixed to the first rotor 320 as described above. In this case, a nozzle 160 held by the holding member 170 may be provided such that an extension line L of the center line of a discharge port 161 of the nozzle 160 is orthogonal to an extension line 321 of the rotation center line of the first rotating body 320. In such a configuration, too, even if a reaction force is generated when the content of the aerosol container 110 is discharged from the discharge port 161 of the nozzle 160, the reaction force does not act as a torque for rotating the first rotating body 320. Here, note that four or more rotating bodies may be provided.

<Modifications of Discharge Apparatus>

As described above, a discharge apparatus has a function for discharging (injecting) the content of an aerosol container 110. In the above-described embodiments, a configuration has been shown in which a driving mechanism 240 presses a bottom portion 112 of the aerosol container 110 toward a head portion thereof to move the aerosol container 110, thereby bringing a valve mechanism 130 of the aerosol container 110 into an open state. However, in the present invention, the structure for realizing the function for discharging (injecting) the content of the aerosol container is not limited to such a configuration. For example, a mechanism can also be provided for pressing an actuator provided in the aerosol container toward the bottom side thereof. In addition, the function of discharging (injecting) the content of the aerosol container can be exhibited, by separately providing a valve mechanism in a cartridge. Here, an example of the latter will be described with reference to FIG. 33.

In a discharge apparatus main body 200X according to a modification illustrated in FIG. 33, an aerosol container 110 is mounted inside a frame body 210 having a hollow inside. In this modification, a container body 111 is fixed to the inside of the frame body 210. In addition, in the aerosol container 110 attached to the discharge apparatus main body 200X, a stem 120 is configured to be always in a depressed state, and a valve provided inside the aerosol container 110 is always in an open state. For example, when the aerosol container 110 is mounted on the frame body 210, the stem 120 can be pressed down by a pressing portion (not shown) fixed to the frame body 210.

Then, in this modification, a valve mechanism 250 is provided in the middle of a flow passage 120X connected to a discharge flow passage in the stem 120. As an example of this valve mechanism 250, there can be mentioned a solenoid valve. According to such a configuration, the valve can be opened and closed by controlling the valve mechanism 250, so that a function of discharging (injecting) the content of the aerosol container 110 can be exhibited.

<Electric Equipment>

In particular, with reference to FIG. 25, electric equipment for driving the camera-equipped discharge apparatus 1010 and the aerial vehicle 100 will be described. In FIG. 25, the electric equipment is illustrated in a simplified form. The discharge apparatus control unit 410, which controls the camera-equipped discharge apparatus 1010, is provided separately from the flight control unit 610, which controls the flight of the aerial vehicle 100. The flight control unit 610 and the discharge apparatus control unit 410 are both arranged in the airframe 101. Note that a power supply for driving the camera-equipped discharge apparatus 1010 and a power supply for driving the aerial vehicle 100 are also arranged in the airframe 101 (both are not illustrated). Also, note that these power supplies may be incorporated in each control unit or may be provided separately from the control units.

In addition, a flight communication unit 612 including an antenna 611 for remotely controlling the aerial vehicle 100 and a discharge apparatus communication unit 412 including an antenna 413 for remotely controlling the camera-equipped discharge apparatus 1010 are mounted on the airframe 101.

A part or all of the flight control unit 610, the flight communication unit 612, and the flight power supply may have the roles of the discharge apparatus control unit 410, the discharge apparatus communication unit 412, and the discharge apparatus power supply.

Although a structure for connecting the discharge apparatus main body 200 and the airframe 101 and a connection structure for connecting the direction changing device 300 and the airframe 101 described above are not particularly illustrated, various known techniques can be employed. For example, a sliding type fitting structure including a slide rail and a T-shaped groove, as well as a structure such as bayonet coupling in which engagement and disengagement can be performed in a rotational direction, may be employed, or various structures that facilitate detachment and attachment, such as screw fastening, clip coupling, clamping, etc., may be employed.

Then, in a portion of the connection structure, there can be provided electrical contacts that electrically connect a power supply or the like, which is arranged on the side of the airframe 101, to the motor 241 provided on the side of the discharge apparatus main body 200 and each motor provided on the side of the direction changing device 300. In addition, the power supply or the like arranged on the side of the airframe 101 can be electrically connected to the motor 241 provided on the side of the discharge apparatus main body 200 and each motor provided on the side of the direction changing device 300, by using cables and connectors attached to the cables.

<Operation of Aerial Vehicle with Discharge Apparatus>

In particular, the operation of the aerial vehicle 100 with the camera-equipped discharge apparatus 1010 according to the present embodiment will be described with reference to FIG. 34. The flight of the aerial vehicle 100 is remotely controlled by operating levers 511, 512 provided on a first operation terminal 510 to transmit an operation signal from an antenna 513 to the flight communication unit 612. This first operation terminal 510 is provided with a display 514 that displays images taken by the camera 180. Also, in the present embodiment, a second operation terminal 520 is also provided. By operating levers 521, 522 in this second operation terminal 520, an operation signal is transmitted from an antenna 523 to the discharge apparatus communication unit 412, so that the direction changing device 300 is remotely operated. In addition, an operation signal is transmitted from the antenna 523 to the discharge apparatus communication unit 412 by means of a discharge button 525 and a stop button 526, so that the valve mechanism 130 of the aerosol container is remotely operated. This second operation terminal 520 is also provided with a display 524 that displays images taken by the camera 180.

When the operator presses the discharge button 525 while viewing the images on the display 524, a discharge command signal is transmitted, so that the content of the aerosol container 110 is discharged from the nozzle 160. When the stop button 526 is pressed, a stop command signal is transmitted so that the discharge from the nozzle 160 is stopped.

The discharge and stop can be switched not only by operating a button but also automatically according to a program stored in advance. For example, a flight route may have been programmed in advance, and a position on a map may be detected by signals from a GPS and a height may be detected by an altimeter, so that discharge may be started when a predetermined position is reached, and the discharge may be stopped when the discharge in a predetermined area has been completed.

Advantages of Discharge Apparatus According to Present Embodiment

In cases where a direction changing device for the camera and a direction changing device for the nozzle are respectively provided, not only the entire weight will increase but also a control method and an operation method for controlling the respective directions of the camera and the nozzle will become complicated.

According to the camera-equipped discharge apparatus 1010 of the present embodiment, a configuration is adopted in which the nozzle 160 and the camera 180 are operated in unison by means of a common direction changing device (300, 300*a*, 300*b*), and hence, it is not necessary to separately provide a direction changing device for the nozzle and a direction changing device for the camera. With this, it is possible to achieve weight reduction while making it possible to change the direction of the camera 180 and the direction of the nozzle 160. In addition, it is possible to simplify the control method for changing the direction of the camera 180 and the direction of the nozzle 160. Further, since it is configured such that the nozzle 160 does not enter the photographing or imaging range of the camera 180 in a state in which the nozzle 160 and the camera 180 are held by the holding member 170, the nozzle 160 will not be photographed even if the directions of the nozzle 160 and the camera 180 are changed. Therefore, the field of view can be made large at all times.

In addition, in the present embodiment, it is possible to suppress a reaction force generated upon discharge of the content from the nozzle 160 from acting as a torque for rotating each of the rotating bodies (the first rotating body 320, the second rotating body 350, and the third rotating body 380). Therefore, when the content is discharged, it is possible to suppress the directions of the nozzle 160 and the camera 180 from being changed.

Second Embodiment of Third Solution

Figure 35:
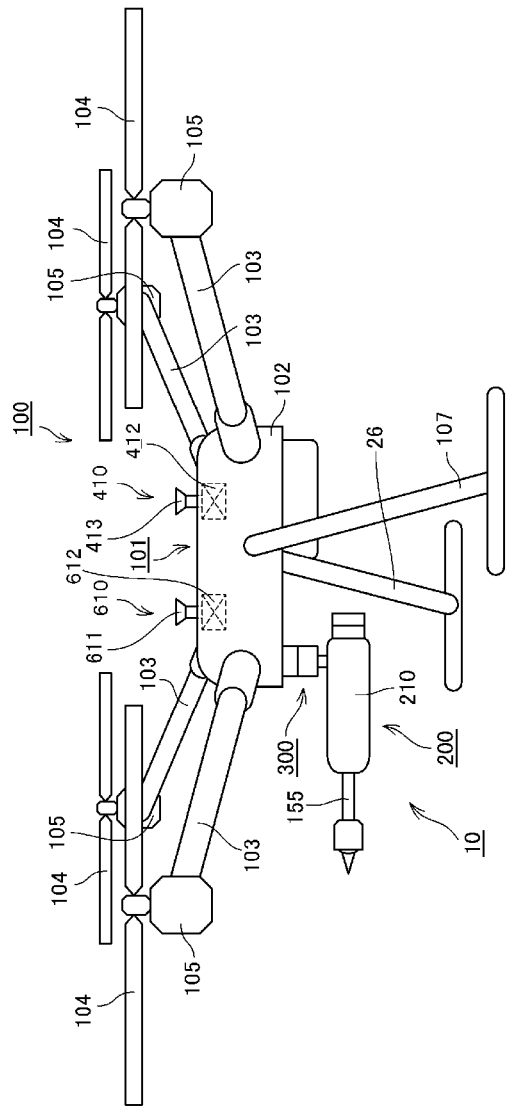
FIG. 35 is an external view of an aerial vehicle with a camera-equipped discharge apparatus according to a second embodiment of the invention of the third solution.
Figure 36:
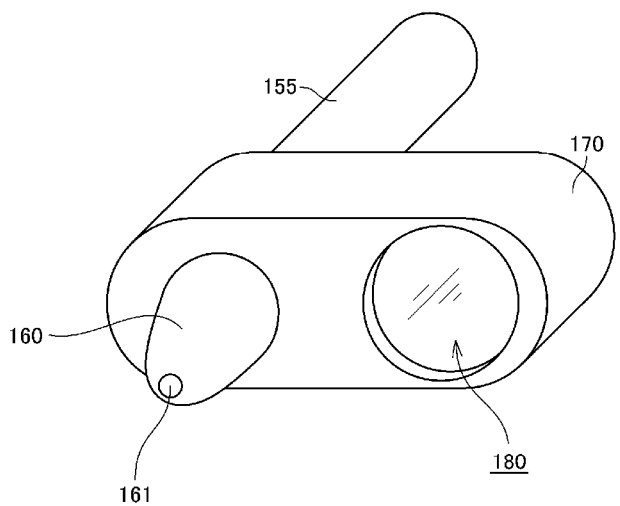
FIG. 36 is a perspective view illustrating a main component of the camera-equipped discharge apparatus according to the second embodiment of the invention of the third solution.

A second embodiment of the present invention is illustrated in FIGS. 35 and 36. In the above-mentioned first embodiment, a configuration has been illustrated in which the holding member that holds the nozzle and the camera is attached to the direction changing device, and the discharge apparatus is attached to the airframe. On the other hand, in the present embodiment, a configuration is illustrated in which a discharge apparatus including a nozzle and a camera is attached to a direction changing device. Since other configurations and operations are the same as those of the first embodiment, the same components are denoted by the same reference signs, and the description thereof will be omitted.

FIG. 35 is an external view of an aerial vehicle including a camera-equipped discharge apparatus according to the second embodiment of the present invention, and illustrates the external view of the aerial vehicle as seen from a lateral side. FIG. 36 is a perspective view illustrating a main component of the camera-equipped discharge apparatus according to the second embodiment of the present invention.

In the present embodiment, too, the camera-equipped discharge apparatus 1010 is provided in the aerial vehicle 100, similarly to the case of the first embodiment. Since the configuration of the aerial vehicle 100 is the same as that of the first embodiment, the description thereof will be omitted.

In the present embodiment, too, the direction changing device 300 is provided on a lower surface of an airframe fuselage 102. Since the configuration of the direction changing device 300 is the same as that of the first embodiment, the description thereof will be omitted. Here, note that in the present embodiment, too, the direction changing devices 300a, 300b according to the various modifications described in the first embodiment can be employed.

Then, in the present embodiment, the direction changing device 300 is provided with a discharge apparatus main body 200. The configuration of the discharge apparatus main body 200 itself is the same as the configuration described with reference to FIGS. 26 and 27 in the above-mentioned first embodiment. However, in the case of the above-mentioned first embodiment, the connection tube 150 is connected to the actuator 140, whereas in the case of the present embodiment, a pipe 155 made of a material having high rigidity is connected to the actuator 140, which is different from the above-mentioned first embodiment.

In addition, in the present embodiment, a holding member 170 that holds a nozzle 160 and a camera 180 is attached to a distal end side of this pipe 155. Note that the nozzle 160 is attached to a distal end of the pipe 155. Since the configurations of the nozzle 160, the camera 180, and the holding member 170 that holds them are the same as those in the above-mentioned first embodiment, the description thereof will be omitted. Note that the relationship between an extension line of a center line of a discharge port 161 of the nozzle 160 and an extension line of a rotation center line of each rotating body included in the direction changing device 300 is also the same as in the above-mentioned first embodiment.

Thus, the present embodiment is different from the above-mentioned first embodiment in that the nozzle 160 and the camera 180 are held by a frame body holding the aerosol container (i.e., a frame body 210 of the discharge apparatus main body 200).

It is needless to say that the camera-equipped discharge apparatus according to the present embodiment configured as described above can also achieve the same effects as in the case of the above-mentioned first embodiment.

Third Embodiment of Third Solution

Figure 37:
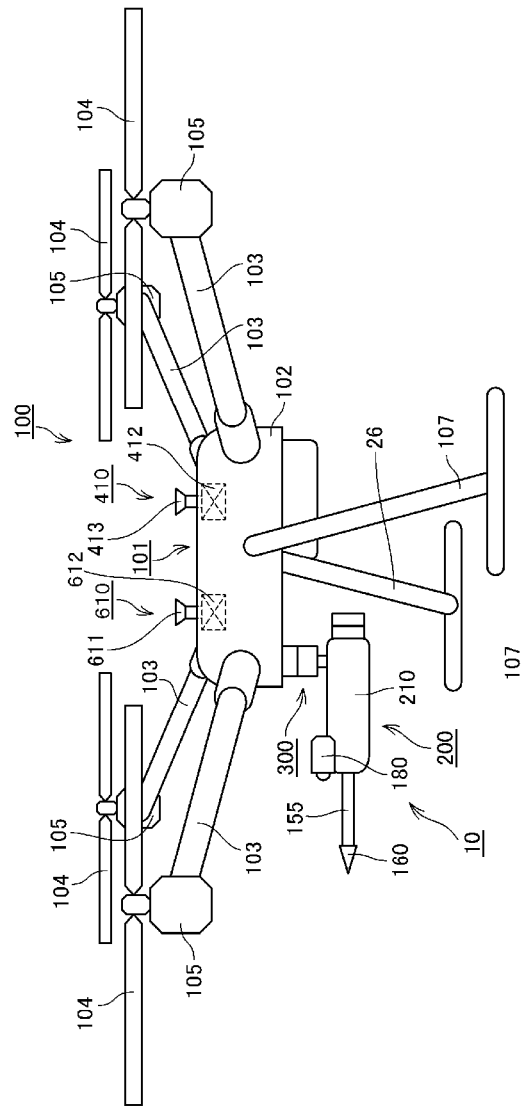
FIG. 37 is an external view of an aerial vehicle with a camera-equipped discharge apparatus according to a third embodiment of the invention of the third solution.
Figure 38:
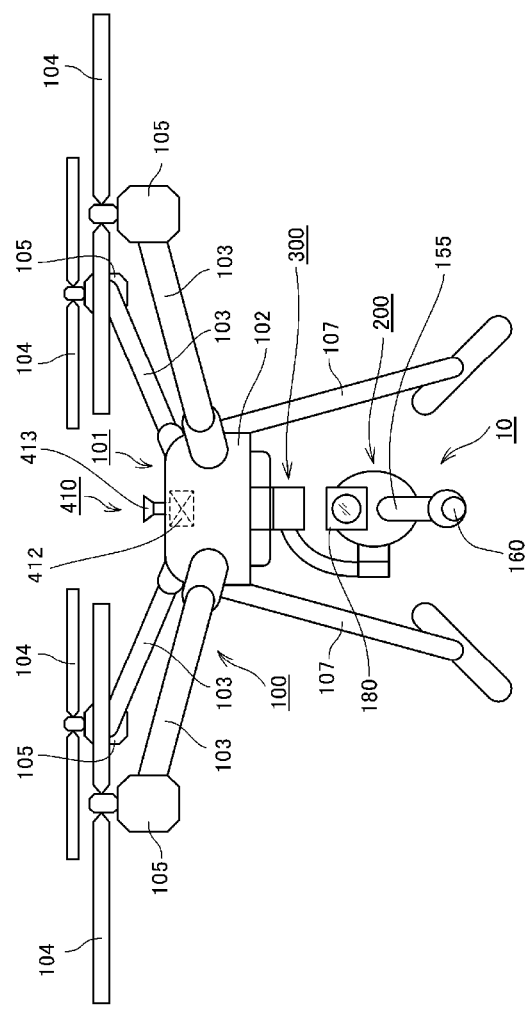
FIG. 38 is an external view of the aerial vehicle with the camera-equipped discharge apparatus according to the third embodiment of the invention of the third solution.

FIGS. 37 and 38 illustrate a third embodiment of the present invention. In the above-mentioned first embodiment, the configuration has been illustrated in which the holding member that holds the nozzle and the camera is attached to the direction changing device, and the discharge apparatus is attached to the airframe. On the other hand, in the present embodiment, a configuration is illustrated in which a discharge apparatus including a nozzle and a camera is attached to a direction changing device. Since other configurations and operations are the same as those of the first embodiment, the same components are denoted by the same reference signs, and the description thereof will be omitted.

FIG. 37 is an external view of an aerial vehicle including a camera-equipped discharge apparatus according to the third embodiment of the present invention, and illustrates an external view of an unmanned aircraft as seen from a lateral side. FIG. 38 is an external view of the unmanned aircraft including a discharge apparatus according to the third embodiment of the present invention, and illustrates the external view of the unmanned aircraft as seen from a front side.

In the present embodiment, too, similarly to the case of the above-mentioned first embodiment, a camera-equipped discharge apparatus 1010 is provided in an aerial vehicle (unmanned aircraft) 100. Since the configuration of the aerial vehicle 100 is the same as that of the above-mentioned first embodiment, the description thereof will be omitted.

In the present embodiment, too, a direction changing device 300 is provided on a lower surface of an airframe fuselage 102. Since the configuration of the direction changing device 300 is the same as that of the first embodiment, the description thereof will be omitted. Here, note that in the present embodiment, too, the direction changing devices 300a, 300b according to the various modifications described in the above-mentioned first embodiment can be employed.

Then, in the present embodiment, the direction changing device 300 is provided with a discharge apparatus main body 200. The configuration of the discharge apparatus main body 200 itself is the same as the configuration described with reference to FIGS. 26 and 27 in the above-mentioned first embodiment. However, in the case of the above-mentioned first embodiment, the connection tube 150 is connected to the actuator 140, whereas in the case of the present embodiment, a pipe 155 made of a material having high rigidity is connected to the actuator 140, which is different from the above-mentioned first embodiment.

Moreover, in the present embodiment, a nozzle 160 is attached to a distal end of the pipe 155. Further, a camera 180 is attached to an outer wall surface of a frame body 210 of the discharge apparatus main body 200. Note that, in addition to the configuration in which the camera 180, which is separate from the frame body 210, is attached to the surface of the frame body 210, a configuration in which the camera 180 is integrally built in the frame body 210, or a configuration in which the frame body 210 and a housing of the camera 180 are integrated with each other, may be employed. The present embodiment is the same as the case of the above-mentioned first embodiment in that the camera 180 is arranged at a position where the discharge state of the content discharged from the nozzle 160 can be photographed or imaged, and in that the camera 180 is arranged such that the nozzle 160 does not enter the imaging range of the camera 101. In the present embodiment, too, the direction of the discharge apparatus main body 200 is changed by the direction changing device 300, so that the nozzle 160 and the camera 180 are operated in unison (the directions thereof are changed in unison).

Note that the relationship between an extension line of a center line of a discharge port 161 of the nozzle 160 and an extension line of a rotation center line of each rotating body included in the direction changing device 300 is also the same as in the above-mentioned first embodiment.

Thus, the present embodiment is different from the above-mentioned first embodiment in that the nozzle 160 and the camera 180 are held by the frame body holding the aerosol container (i.e., the frame body 210 of the discharge apparatus main body 200).

It is needless to say that the discharge apparatus according to the present embodiment configured as described above can also achieve the same effects as in the case of the above-mentioned first embodiment.

DESCRIPTION OF REFERENCE SIGNS (First Solution and Second Solution)
 1 discharge apparatus
 10 aerosol container
 11a body portion, 11b bottom portion, 11d mounting cup
 12 stem, 12a discharge flow passage, 12b stem hole
 13 valve mechanism
 13a gasket, 13b spring
 14 actuator 14*a* main body portion, 14*b* flange portion
15 nozzle, 15*a* injection port
151 nozzle main body, 152 joint portion
16 tube
20 sleeve (housing member)
21 sleeve main body
21*a* radial support portion
22 first end cover portion
221 pressing member, 221*a* tubular body, 221*b* end flange portion
222 cover main body, 223 threaded tubular portion
23 second end cover portion
231 tubular portion, 232 end plate
30 discharge drive unit
31 motor, 32*a* cam, 32*b* movable plate
32*c* cam follower
72 container holding portion, 72*a* circular plate portion, 72*b* annular convex portion
72*c* connecting shaft portion
30C external valve, 30D pipe conduit
40 aerosol container assembly
50 nozzle support portion
17 joint portion (FIG. 11)
17*a* outlet side pipe portion, 17*b* inlet side pipe portion
17*c* one-way valve
17*c*1 inlet port, 17*c*2 outlet port, 17*c*3 housing
17*c*4 valve body, 17*c*5 spring, 17*c*6 spring seat portion
17*c*7 convex portion
18 nozzle holding member (FIG. 12, FIG. 13)
100 aerial vehicle
101 airframe, 102 airframe fuselage, 103 arm portion
104 rotor blade, 105 motor, 106 camera, 107 leg portion
108 small wing
109 mounting frame
300 direction changing device
310 first motor, 340 second motor, 370 third motor
320 first rotating body, 350 second rotating body, 380 third rotating body
321 extension line of rotation center, 351 extension line of rotation center, 381 extension line of rotation center
330 first arm, 360 second arm
410 discharge apparatus control unit, 411 discharge apparatus power supply, 412 discharge apparatus communication unit
413 antenna
610 flight control unit, 612 flight communication unit
510 first operation terminal (control terminal)
511, 512 levers, 513 antenna, 514 display
520 second operation terminal
511, 512 levers, 524 display
525 discharge button, 526 stop button
N central axis of aerosol container
N central axis of aerosol container
X roll axis, Y pitch axis, and Z yaw axis
(Third Solution)
1010 camera-equipped discharge apparatus
100 aerial vehicle (unmanned aircraft)
101 airframe, 102 airframe fuselage, 103 arm portion, 104 rotor blade, 105 motor, 107 leg portion
110 aerosol container
111 container, 112 bottom portion, 113 mounting cup
120 stem, 120X flow passage, 121 discharge flow passage, 122 stem hole
130 valve mechanism, 131 gasket, 132 spring
140 actuator, 141 tubular portion, 142 flange portion
150 connection tube
155 pipe
160 nozzle, 161 discharge port
170 holding member
180 camera
200, 200X discharge apparatus
210 frame body (housing member)
210X frame main body portion, 211 female threaded portion
220 first cover portion, 2201 cover main body, 2201*a* male threaded portion
2202 pressing member, 2202*a* tubular portion, 2202*b* end flange portion
230 second cover portion
240 drive mechanism
241 motor, 242 cam, 243 cam follower, 244 bottom support member
250 valve mechanism
300, 300*a*, 300*b* direction changing devices
310 first motor, 340 second motor, 370 third motor
320 first rotating body, 350 second rotating body, 380 third rotating body
321, 351, 381 extension lines
330 first arm, 360 second arm
355, 385 connecting portions
610 flight control unit
612 flight communication unit, 611 antenna
410 discharge control device
412 discharge apparatus communication unit, 413 antenna
510 first operation terminal
511, 512 levers, 513 antenna, 514 display
520 second operation terminal
521, 522 levers, 523 antenna, 524 display, 525 discharge button, 526 stop button

The invention claimed is:

1. A camera-equipped discharge apparatus comprising: a nozzle configured to discharge a content of an aerosol container for mounting on a moving vehicle and a camera for mounting on the moving vehicle, wherein the nozzle and the camera are arranged so as to be operated in unison by a common direction changing device, wherein:
the direction changing device includes at least one rotating body that rotatably supports the nozzle such that a direction of the nozzle can be changed,
an extension line of a center line of a discharge port in the nozzle intersects with extension lines of rotation center lines of all the rotating bodies, and
the direction changing device comprises:
a first motor;
a first rotating body configured to rotate by a driving force of the first motor;
a second motor configured to turn in accordance with rotation of the first rotating body;
a second rotating body configured to rotate by a driving force of the second motor;
a third motor configured to turn in accordance with rotation of the second rotating body; and
a third rotating body configured to rotate by a driving force of the third motor; and
wherein the nozzle is arranged so as to change its direction in accordance with an operation of the third rotating body.

2. A camera-equipped discharge apparatus comprising: a nozzle configured to discharge a content of an aerosol container for mounting on a moving vehicle; and a camera for mounting on the moving vehicle, wherein the nozzle and the camera are arranged so as to be operated in unison by a common direction changing device, wherein:

the direction changing device includes at least one rotating body that rotatably supports the nozzle such that a direction of the nozzle can be changed, an extension line of a center line of a discharge port in the nozzle intersects with extension lines of rotation center lines of all the rotating bodies, and the direction changing device comprises:

a first motor;

a first rotating body configured to rotate by a driving force of the first motor;

a second motor configured to turn in accordance with rotation of the first rotating body; and a second rotating body configured to rotate by a driving force of the second motor;

wherein the nozzle is arranged so as to change its direction in accordance with an operation of the second rotating body, and an extension line of a rotation center line of the first rotating body and an extension line of a rotation center line of the second rotating body do not intersect with each other.

3. The camera-equipped discharge apparatus according to claim 2, wherein the first rotating body and the second motor are connected by plate shape members.

* * * * *